US005792545A

United States Patent [19]

Kawai et al.

[11] Patent Number: 5,792,545

[45] Date of Patent: Aug. 11, 1998

[54] DECORATIVE PAPER/EMBOSSING PLATE IN WHICH UNEVEN STRUCTURE OF VESSEL PERFORATION IS REPRODUCED, AND PREPARING METHOD AND PREPARING APPARATUS THEREFOR

[75] Inventors: Naoki Kawai; Toshio Modegi; Tsuneo Miyasaka; Yashiro Hayashi; Hideki Murota; Ieharu Hashizume; Toshio Ariyoshi; Masaru Okamoto; Yoshio Sukegawa, all of Tokyo, Japan

[73] Assignee: Dai Nippon Printing Co., Ltd., Tokyo, Japan

[21] Appl. No.: 532,774

[22] PCT Filed: Feb. 3, 1995

[86] PCT No.: PCT/JP95/00139

§ 371 Date: Nov. 30, 1995

§ 102(e) Date: Nov. 30, 1995

[87] PCT Pub. No.: WO95/21060

PCT Pub. Date: Aug. 10, 1995

[30] Foreign Application Priority Data

Feb. 4, 1994 [JP] Japan .................................... 6-032920

[51] Int. Cl.$^6$ ................................ D06N 7/04; B32B 3/00

[52] U.S. Cl. .......................... 428/153; 428/156; 428/207; 428/211; 428/542.2; 428/904.4

[58] Field of Search .................................... 428/154, 167, 428/84, 136, 141, 153, 156, 207, 211, 537.5, 542.2, 542.6, 904.4

[56] References Cited

U.S. PATENT DOCUMENTS 4,715,623 12/1987 Roule et al. .............................. 283/91

FOREIGN PATENT DOCUMENTS 52-27208 7/1977 Japan .
52-27685 7/1977 Japan .
58-14312 3/1983 Japan .
4308799 10/1992 Japan .

*Primary Examiner*—Donald Loney
*Attorney, Agent, or Firm*—Ladas & Parry

[57] ABSTRACT

On a surface of a decorative paper, vessel perforation of natural wood is reproduced by an offset groove (100) consisting of three steps of embossing grooves (110, 120, 130) of the nesting structure. Respective grooves are such that they are deeper according as positions thereof shift to the internal, and are disposed in a manner to be eccentric in a length direction. Within the groove, a convex bank portion (140) in which the bottom surface is linearly protruded is formed. An embossing plate for processing such an offset groove is prepared on the basis of a vessel cross section pattern inputted by using natural wood. The inputted plane vessel cross section pattern is replaced by an approximate elliptical figure. A three-dimensional virtual vessel perforation model is determined by calculation using the elliptical figure. Equi-depth lines for set predetermined depths are extracted from the three-dimensional model and contour figures of embossing grooves (110, 120, 130) are obtained. Patterning masks using respective equi-depth lines as contour lines are respectively prepared to repeatedly carry out patterning processing with respect to the plate material by successively using respective masks in order from shallower depths to thereby prepare an embossing plate.

12 Claims, 25 Drawing Sheets

BEAM EXPOSURE USING FIRST MASK DATA

BEAM EXPOSURE USING THIRD MASK DATA

EXPOSURE THROUGH FIRST ORIGINAL PLATE FILM

DECORATIVE PAPER/EMBOSSING PLATE IN WHICH UNEVEN STRUCTURE OF VESSEL PERFORATION IS REPRODUCED, AND PREPARING METHOD AND PREPARING APPARATUS THEREFOR

TECHNICAL FIELD

This invention relates to a decorative paper such as a wall-paper, etc. in which uneven patterns copying after vessel perforation of natural wooden plate are formed on the surface thereof, and an embossing plate used for mass-producing such decorative papers. In addition, this invention relates to a method and an apparatus for preparing such an embossing plate, and more particularly to a technology for preparing mask data for vessel perforation

BACKGROUND ART

Decorative papers such as wall-paper, etc. representing disposition of natural wooden plate are widely utilized as material for decorating surfaces of building material, furniture or cabinet of electrical appliance, etc. Ordinarily, on such decorative papers, patterns copying after grain of natural wooden plate are printed, and grain patterns having unevenness are formed. Grain patterns having unevenness appearing on a cutting plane (cross section) of natural wood are patterns obtained by cutting vessels inevitable for mainly conducting physiological action as plant, and cut vessel portions appear on a surface of wood as vessel perforations. Accordingly, in order to artificially represent disposition of a natural wooden plate, it is important to reproduce, as faithfully (precisely) as possible, vessel perforations existing on a surface of natural wood. For this reason, in manufacturing processes for general wall-paper, etc., an embossing plate in which vessel perforations are faithfully reproduced is prepared to carry out forming (embossing) of uneven patterns on a surface of wall paper, etc. by using such an embossing plate.

In order that vessel perforations formed (embossed) on a wall-paper are caused to look like natural grain as closely as possible, it is sufficient to prepare uneven patterns formed on an embossing plate on the basis of actual vessel perforations formed at a cross section of natural wood. For this reason, there is ordinarily employed a method of extracting patterns of grain appearing on a surface of a natural wood by the photographing method, etc. to form patterns thus extracted on an embossing plate by using photolithographic technique. Since natural timber (wood) is originally used as motif, uneven patterns formed on the embossing plate become patterns close to natural grain.

Further, as a technique for faithfully reproducing a vessel perforation shape of natural wood, there also exists so called "electroforming method") of molding a surface shape of natural wooden plate by silicon resin, etc. to prepare a mold and carrying out electric plating with respect to a matrix using the mold as an original mold then to separate a precipitated metallic layer from the matrix.

However, in the above-described conventional method for preparing a vessel perforation embossing plate by the photolithographic technique, there is the problem that information of depth of vessel perforation is not reflected. Natural vessel perforation is a perforation obtained by cutting a vessel and therefore depth varies in dependency upon respective portions within the perforation. Meanwhile, when pattern of grain appearing on a surface of natural timber is extracted by the photographic method, etc. as described above, only information relating to shape of a cut end of a vessel perforation would be extracted, and information relating to depth would be lost. For this reason, in wall-papers in which uneven pattern of grain is transferred from a conventional vessel perforation embossing plate, depths of respective vessel perforations would be inevitably substantially uniform, thus failing to faithfully reproduce disposition of natural grain. On the contrary, in accordance with the electroforming method, while a vessel perforation shape of natural wooden plate can be certainly faithfully reproduced in a manner to include a contour shape of a cut end or gradation of depth, there result, as compared to the photolithography method, increased number of steps and/or manufacturing time, and cost is also increased.

DISCLOSURE OF THE INVENTION

An object of this invention is to provide a decorative paper including vessel perforations having information of depth so as to permit reproduction of disposition of natural grain, and an embossing plate used for mass-producing such decorative papers, and is to also provide a preparing method and a preparing apparatus for embossing plate, which can prepare such an embossing plate by using a simple photolithographic method.

In order to attain such object, this invention has the following features.

(1) A first mode of this invention is directed to a decorative paper in which uneven structure of vessel perforation is reproduced on a surface, wherein a plurality of closed areas which take a structure nested each other and are elongated with respect to a common length direction are defined, and wherein, with respect to the respective closed areas, setting is made such that a closed area located more inwardly of the nesting structure is caused to have greater depths to thereby constitute an offset groove at a surface of a base material, thus to form one vessel perforation by the offset groove.

(2) A second mode of this invention is such that, in the above-described decorative paper according to the first mode, positions of the respective closed areas which take the nesting structure are set so that a center position of a closed area located more inwardly is caused to be eccentric to more degree in one direction with respect to the length direction than a center position of a closed area located more outwardly.

(3) A third mode of this invention is such that, in the above-described decorative paper according to the first or second mode, intersecting portions of bottom surfaces and side surfaces of respective portions of the offset groove are caused to have round portions, and setting is made such that the rounded portions with respect to deeper portions are caused to have smaller radius of curvature.

(4) A fourth mode of this invention is such that, in the above-described decorative paper according to the first to third modes, within the offset groove, there is formed a convex bank portion in which a bottom surface of the groove is linearly protruded.

(5) A fifth mode of this invention is such that, in the above-described decorative paper according to the first to fourth modes, wiping ink having a predetermined transparency is filled into the offset groove in order that density distribution based on depth distribution of the offset groove can be observed.

(6) A sixth mode of this invention is such that, in the above-described decorative paper according to the first to fifth modes, the base material is constituted by a sheet layer consisting of thermoplastic resin and a print ink layer in which grain pattern is represented.

(7) A seventh mode of this invention is directed to an embossing plate in which uneven structure of vessel perforation is reproduced on a surface, wherein a plurality of closed areas which take a structure nested each other and are elongated with respect to a common length direction are defined, and wherein, with respect to the respective closed areas, setting is made such that a closed area located more inwardly of the nesting structure is caused to have greater height to thereby constitute an offset protruded body on a surface of a plate material to form a projected portion corresponding to one vessel perforation by the offset protruded body.

(8) An eighth mode of this invention is such that, in the above-described embossing plate according to the seventh mode, positions of the respective closed areas which take the nesting structure are set so that a center position of a closed area located more inwardly is caused to be eccentric to more degree in one direction with respect to the length direction than a center position of a closed area located more outwardly.

(9) A ninth mode of this invention is such that, in the above-described embossing plate according to the seventh or eighth mode, intersecting portions of upper surfaces and side surfaces of respective portions of the offset protruded body are caused to have rounded portion, and setting is made such that rounded portions with respect to higher portions are caused to have smaller radius of curvature.

(10) A tenth mode of this invention is such that, in the above-described embossing plate according to the seventh to ninth modes, a concave recessed portion comprised of a linear groove is formed at a portion of an upper surface of the offset protruded body.

(11) An eleventh mode of this invention is directed to a method of preparing an embossing plate in which an uneven structure of vessel perforation is reproduced, wherein there are carried out:

a stage for preparing a grain vessel cross section pattern consisting of a large number of closed areas as binary picture data, a stage for defining, on the basis of information of a contour line in the grain vessel cross section pattern, depths with respect to respective positions within a closed area encompassed by the contour line to specify shape of a virtual vessel perforation;

a stage for setting plural different depths with respect to the virtual vessel perforation to determine equi-depth lines each consisting of a closed curve every respective set depths;

a stage for preparing, every respective set depths, mask data each distinctively indicating an internal area encompassed by the equi-depth line and an external area existing outside the internal area; and a stage for repeatedly executing, with respect to a plate material serving as material of the embossing plate, by using mask data of respective set depths in order from shallower set depth to deeper set depth, three process steps of;

(a) a step of forming a resist film on a surface of the plate material, scanning a predetermined beam on the basis of an used mask data to thereby allow the resist film to be partially exposed to light, and developing it to thereby allow only a portion corresponding to the internal area encompassed by the equi-depth line of the resist film to be left, (b) a step of implementing etching processing to the surface of the plate material partially covered by the resist film to remove an exposed surface of the plate material down to a predetermined depth, and (c) a step of removing the resist film.

(12) A twelfth mode of this invention is such that, in the above-described embossing plate preparing method according to the eleventh mode, a contour line in the grain vessel cross section pattern is caused to be approximate to ellipse to prepare a geometrical cross sectional model of a cylindrical vessel on the basis of lengths of a major axis and a minor axis of the ellipse to specify shape of a virtual vessel perforation on the basis of the geometrical cross sectional model.

(13) A thirteenth mode of this invention is directed to a method of preparing an embossing plate in which uneven structure of vessel perforation is reproduced, therein there are carried out:

a stage for preparing a grain vessel cross section pattern consisting of a large number of closed areas as binary picture data, a stage for defining, on the basis of information of a contour line in the grain vessel cross section pattern, depths with respect to respective positions within a closed area encompassed by the contour line to specify shape of a virtual vessel perforation;

a stage for setting plural different depths with respect to the virtual vessel perforation to determine equi-depth lines each consisting of a closed curve every respective set depths;

a stage for preparing, every respective set depths, original plate films in which transparency of an internal area encompassed by the equi-depth line and that of an exterior area existing outside the internal area are different from each other; and a stage for repeatedly executing, with respect to a plate material serving as material of the embossing plate, by using original plate films of respective set depths in order from shallower set depth to deeper set depth, three process steps of;

(a) a step of forming a resist film on a surface of the plate material, allowing the resist film to be exposed to light through an used original plate film, and developing it to thereby allow only a portion corresponding to the internal area encompassed by the equi-depth line of the resist film to be left, (b) a step of implementing etching processing to the surface of the plate material partially covered by the resist film to remove an exposed surface of the plate material down to a predetermined depth, and (c) a step of removing the resist film.

(14) A fourteenth mode of this invention is such that, in the above-described embossing plate preparing method according to the thirteenth mode, a contour line in the grain vessel cross section pattern is caused to be approximate to ellipse to prepare a geometrical cross sectional model of a cylindrical vessel on the basis of lengths of a major axis and a minor axis of the ellipse to specify shape of a virtual vessel perforation on the basis of the geometrical cross sectional model.

(15) A fifteenth mode of this invention is directed to a mask data preparing apparatus utilized for preparing an embossing plate in which uneven structure of vessel perforation is reproduced, wherein there are provided:

pattern input means for inputting information of a contour line of a grain vessel cross section pattern as digital picture data;

approximate figure defining means for defining an approximate figure which is approximate to the contour line of the inputted pattern and can be represented by a numerical formula;

corresponding point calculating means for determining corresponding points where positions are relatively in correspondence with each other within the defined approximate figure with respect to respective positions within a closed area encompassed by the contour line of the inputted pattern;

virtual vessel perforation specifying means for preparing a geometrical cross sectional model of vessel on the basis of dimensions of the defined approximate figure to determine depths of the vessel perforation at respective corresponding point positions determined by the corresponding point calculating means by using the geometrical cross sectional model thus to specify shape of a virtual vessel perforation, depth setting means for setting plural different depths with respect to the virtual vessel perforation, equi-depth line extracting means for extracting equi-depth lines each consisting of a closed curves every respective set depths with respect to the virtual vessel perforation; and mask data preparing means for preparing mask data each distinctively indicating an internal area encompassed by the equi-depth line and an external area existing outside the internal area.

(16) A sixteenth mode of this invention is such that, in the above-described mask data preparing apparatus according to the fifteenth mode, ellipse is used as a geometrical approximate figure which can be represented by numerical formula, and the virtual vessel perforation specifying means prepares a geometrical cross sectional model by using a length W of a minor axis of the ellipse as a diameter D of a cylindrical vessel and using angle θ which satisfies the relationship expressed as $V=D/\sin\theta$ on the basis of length V of a major axis of the ellipse as an intersecting angle that an axial direction of the vessel and the cutting plane thereof form.

(17) A seventeenth mode of this invention is such that, in the above-described mask data preparing apparatus according to the sixteenth mode, the corresponding point calculating means is such that when determining a corresponding point Q within the ellipse with respect to a point P within a closed area, it performs a calculation for determining position of the corresponding point Q so that distribution position of the point P relating to a length direction of the closed area and distribution position of the point Q relating to a major axis direction of the ellipse are equal to each other, and distribution position of the point P relating to a direction perpendicular to the length direction of the closed area and distribution position of the point Q relating to a minor axis direction of the ellipse are equal to each other.

(18) An eighteenth mode of this invention is such that, in the above-described mask data preparing apparatus according to the seventeenth mode, the mask data preparing means prepares picture data indicating the internal area encompassed by the equi-depth line by a first pixel value and indicating an external area existing outside the internal area by a second pixel value and defines a linear area within the internal area on the basis of random numbers to replace data within the linear area in the prepared picture data by the second pixel value to thereby prepare mask data.

In accordance with the decorative paper/embossing plate, and the preparing method and the preparing apparatus therefor featured as described above, it becomes possible to efficiently prepare a decorative paper including vessel perforations having information of depth and an embossing plate used for mass-producing such decorative papers. Thus, it becomes possible to reproduce disposition of natural grain.

Namely, in the decorative paper according to this invention, one vessel perforation is formed by offset grooves having nesting structure. Thus, it is possible to reproduce vessel perforation having information of plural steps (levels) of depth. Moreover, grooves are caused to be eccentric in length direction every respective steps and intersecting portions of the bottom surfaces and the side surfaces of the grooves are caused to have rounded portions, whereby depth distribution within the vessel perforation becomes closer to that of vessel perforation of natural wood. When wiping ink is filled into the vessel perforation having such a depth distribution, depth distribution of the offset grooves is observed as density distribution, thus making it possible to give rise to disposition of natural wood.

On the other hand, in the vessel perforation embossing plate preparing method according to this invention, depths are defined, on the basis of plane pattern of vessel cross section, with respect to respective positions within the pattern. Thus, shape of virtual vessel perforation is specified. Namely, information of depth are added to respective positions of vessel cross sectional pattern prepared as binary picture data. Thus, virtual vessel perforation having three-dimensional information is specified. Subsequently, plural different depths are set, and equi-depth lines obtained when the virtual vessel perforation is cut crosswise at individual set depths are determined. When plural times of etching operations for the plate material are repeatedly carried out on the basis of such plural equi-depth lines, embossing plate having uneven structure close to natural grain can be formed although structure in slightly stair-step form is left.

The apparatus for preparing mask data for vessel perforation according to this invention can prepare mask data used in the above-described method. In this apparatus, geometrical cross sectional model of cylindrical vessel is prepared on the basis of vessel cross section pattern inputted as binary picture data. Generally, a vessel of natural wood is an elongated cylindrical tube. Accordingly, when this vessel is considered to be a cylinder perfect from a geometrical point of view, and a model is prepared such that the grain vessel cross section pattern is considered to be a cut end obtained by cutting the geometrically perfect cylinder by a plane, it is possible to approximately apply this model to vessel cross section pattern of actual natural wood. Since a cut end of a vessel in such a model becomes geometrically perfect ellipse, when a contour line of a vessel cross section pattern inputted as binary picture data is approximated by an ellipse to make correspondence therebetween, this geometrical model can be applied. If replacement into such a geometrical model is made, it is possible to specify a virtual vessel perforation by a simple arithmetic operation. When the virtual vessel perforation is cut crosswise at individual set depths, equi-depth lines are determined. Thus, mask data having such an equi-depth lines as a contour is prepared. If such mask data is used, it becomes possible to carry out patterning to a resist film for etching a plate material by exposure of beam scanning or by exposure through an original plate film.

BEST MODE FOR CARRYING OUT INVENTION

§1 Vessel perforation cross section pattern of natural wood

An object of this invention is to prepare an embossing plate having uneven pattern as close as vessel cross section pattern of natural wood. In view of this, the property that the vessel cross section pattern of natural wood has will be first briefly described.

Figure 1:
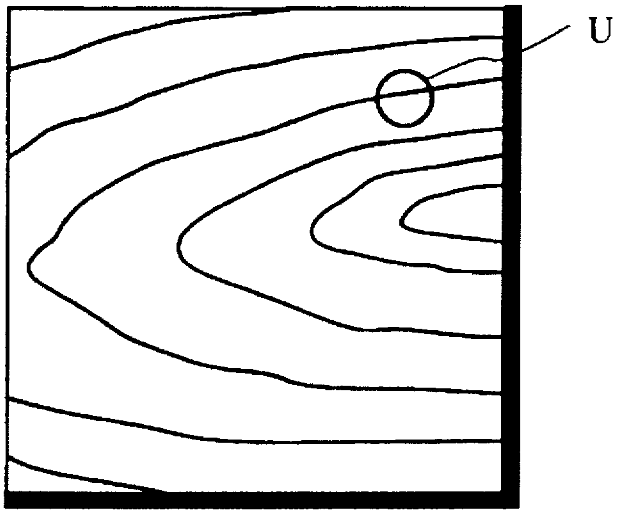
FIG. 1 is a view showing an example of a grain vessel cross section pattern appearing on a timber plate of general natural wood.
Figure 2:
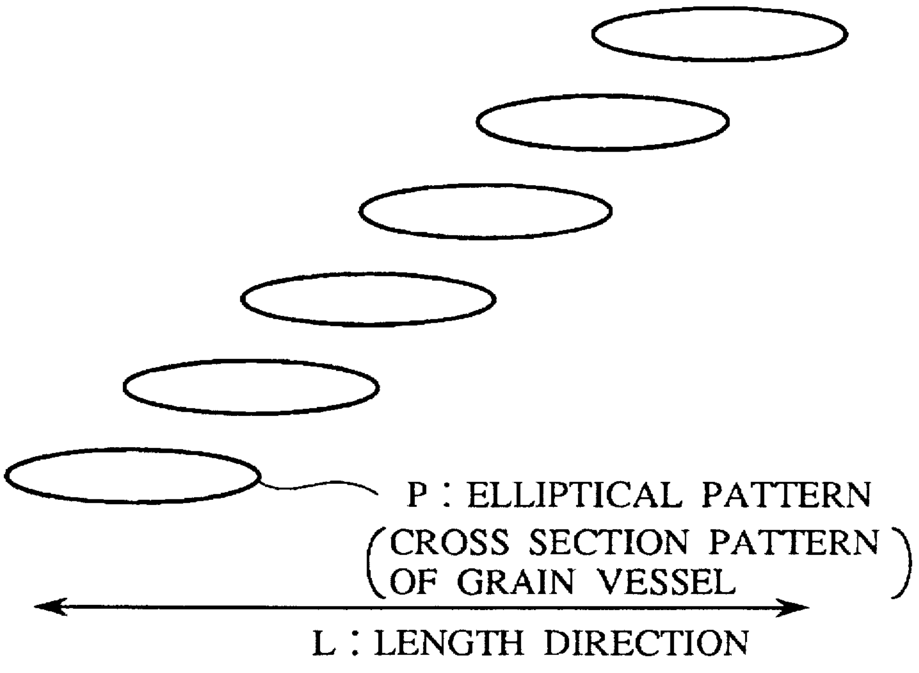
FIG. 2 is an enlarged view within a circular portion area U of the pattern shown in FIG. 1.
Figure 3:
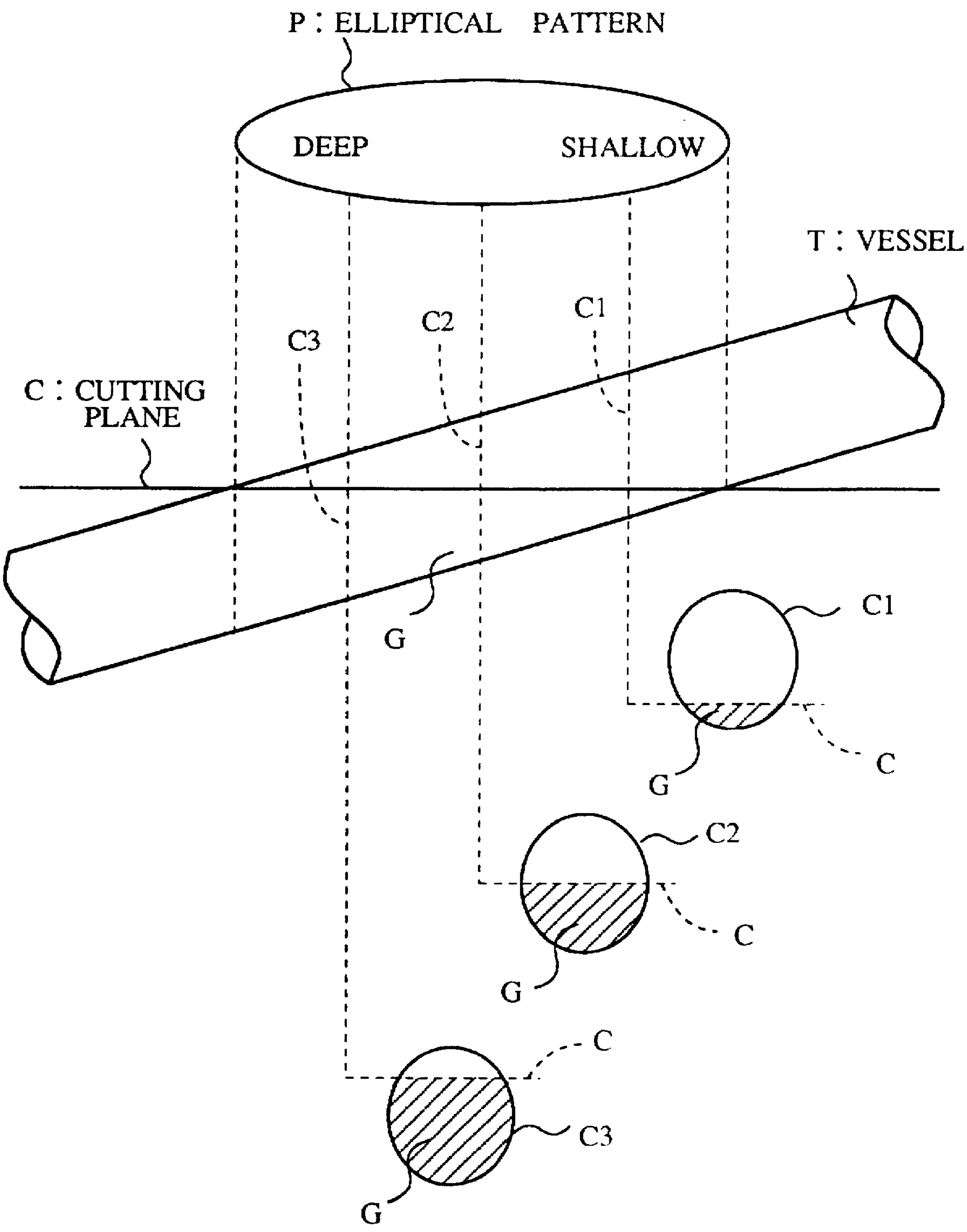
FIG. 3 is a view for explaining depth distribution of a vessel perforation obtained when general natural wood is cut.

A timber plate cut down from most general natural wood is shown in FIG. 1. There are many instances where fine vessel cross section patterns appear along grain patterns which have appeared on the surface of such timber plate. For example, when a circular portion area U indicated in a manner encompassed by small circle in FIG. 1 is magnified, it is seen that grain pattern is constituted by set of elliptical patterns P as shown in FIG. 2. Such an elliptical pattern P is a vessel cross section pattern, i.e., a pattern obtained as a cross section of a vessel existing in natural timber. Let indicate by the model of FIG. 3 where the vessel cross section pattern becomes an elongated substantially elliptical pattern. Explanation will now be given on the assumption that a vessel T existing in the natural timber is completely cylindrical. This vessel T is a tube utilized as a communication path for material necessary for maintenance of life of plant, and extends along a growth direction of plant. Namely, in the case of natural timber, a vessel extends in a direction along a trunk. In the case where timber plate is cut down from such natural wood, the wood is cut in a direction along the trunk so that a plate of broader area can be taken. Accordingly, a length direction axis and a cutting plane C of the vessel T generally form an acute angle as shown in FIG. 3. Accordingly, a cut end of the vessel T appearing on the cutting plane C, i.e., a vessel cross section pattern becomes an elongated elliptical pattern P as indicated at the upper part of FIG. 3.

Meanwhile, plural elliptical patterns P shown in FIG. 2 are all ellipses elongated along the direction of substantially length direction L. This is because vessels T existing within natural timber all extend toward a growth direction of wood, so elliptical patterns P close to each other all have substantially the same direction. Accordingly, also with respect to the entirety of timber plate as shown in FIG. 1, in FIG. 1, it is possible to determine the length direction L (a direction extending in left and right directions of the figure in the case of this example) substantially common to a large number of elliptical patterns existing on the surface.

It should be noted that such an elliptical vessel cross section pattern is a cross section pattern appearing on the cutting plane C, and is nothing but a portion of a cut end of an actual vessel perforation. An actual vessel perforation formed on a surface portion of a timber plate is a concave groove having depth. In view of this, let study what distribution is obtained by depth of a vessel perforation. Let now consider three lateral cross sections C1, C2, C3 with respect to the vessel T in the model shown in FIG. 3. Three ellipses C1, C2, C3 indicated in the lower part of FIG. 3 are cross sections at respective lateral cross sectional positions. Here, horizontal broken lines C indicate position of the cutting plane C, and a hatched portion therebelow indicates an internal area of vessel perforation G formed in the timber plate under the cutting plane C. As apparent from this model, depth of actual vessel perforation G is such that the right side of the figure is the shallowest and the left side of the figure is the deepest. In addition, according as a position shifts from the right to the left, depth gradually becomes deeper, and (the degree of) depth monotonously increases from the right to the left. In addition, depth distribution relating to the minor axis direction of the elliptical pattern P becomes circular arc shaped.

Accordingly, the elliptical pattern P indicated in the upper part of FIG. 3 is merely a plane pattern of cross section, but if information of depth is added to the plane pattern, the right side of the figure is the shallowest and the left side of the figure is the deepest. In addition, since adjacent large number of vessels T extend substantially in the same direction as previously described, the distribution relationships of depth are identical to each other. For example, if distribution information of depth in which the end of the right side of the figure is shallow and the end of the left side thereof is deep can be obtained with respect to one of plural elliptical patterns P shown in FIG. 2, for example, such depth distribution information can be commonly applied also to any other elliptical patterns P. If field of view is extended, such depth distribution information can be commonly applied to all of large number of elliptical patterns formed on the timber plate shown in FIG. 1. It is to be noted that while the same depth distribution information cannot be necessarily commonly applied in connection with such special cases that a direction of grain pattern is changed in the middle, no problem is arisen in most of natural grain plates even if such application is carried out.

It is to be noted while the vessel T is handled as a simple cylindrical vessel in the above-described model, actual vessels are not geometrically perfect cylindrical, but are generally have distorted or irregular shape as a matter of course because they are materials in the natural world. Some vessels have nearly circular cone shape such that according as a position shifts from the root to the top, vessels are gently inclined rather than they are cylindrical (columnar). Accordingly, an actual vessel cross section pattern is not geometrically perfect elliptical, but has somewhat distorted shape.

§2 Conventional vessel perforation embossing plate

Figure 4:
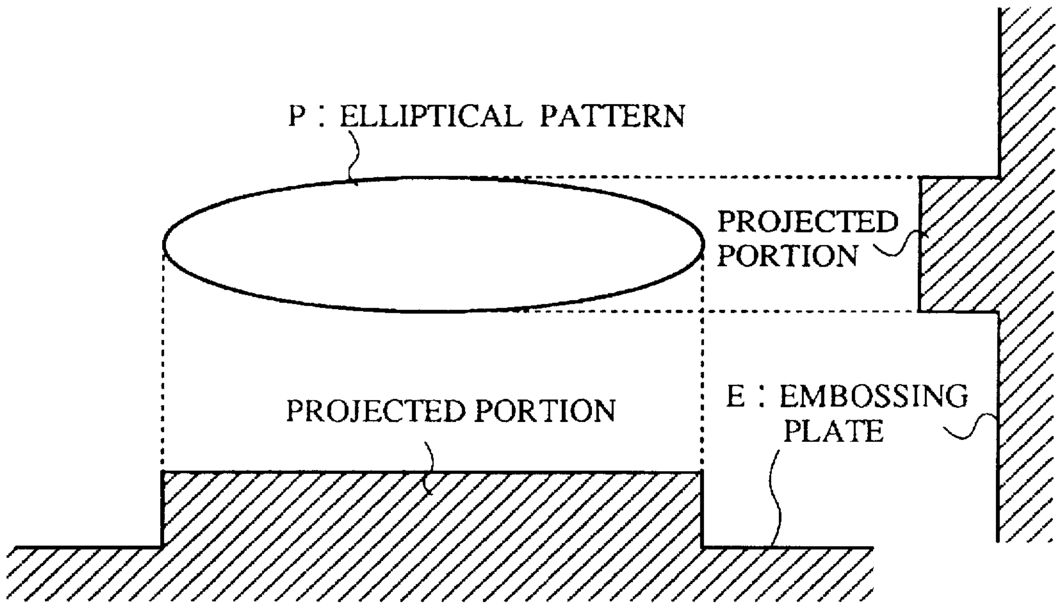
Fig.4 PRIOR ART
FIG. 4 is a view showing a plane pattern and cross sections of a projected portion of a conventional general vessel perforation embossing plate.

A conventional typical method for preparing a vessel perforation embossing plate is a method for extracting a pattern of grain appearing on a surface of a natural timber by photographic method, etc. to form the extracted pattern on an embossing plate by using a technique of photolithography. However, with such method, since an uneven pattern is formed on the embossing plate only by information relating to a vessel cross section pattern appearing on the surface of natural wood, information relating to depth of vessel perforation cannot be reproduced. FIG. 4 is a cross sectional view showing an example where an uneven structure is formed on an embossing plate E by using a plane elliptical pattern P. A projected portion formed on the embossing plate E takes a shape of an elliptical pattern P when viewed from plane, but its height is substantially uniform (Actually, the portion of the corner is slightly rounded on the basis of the characteristic of the etching process), i.e., such a projected portion only has a monotonous protruded (raised) structure.

Figure 5:
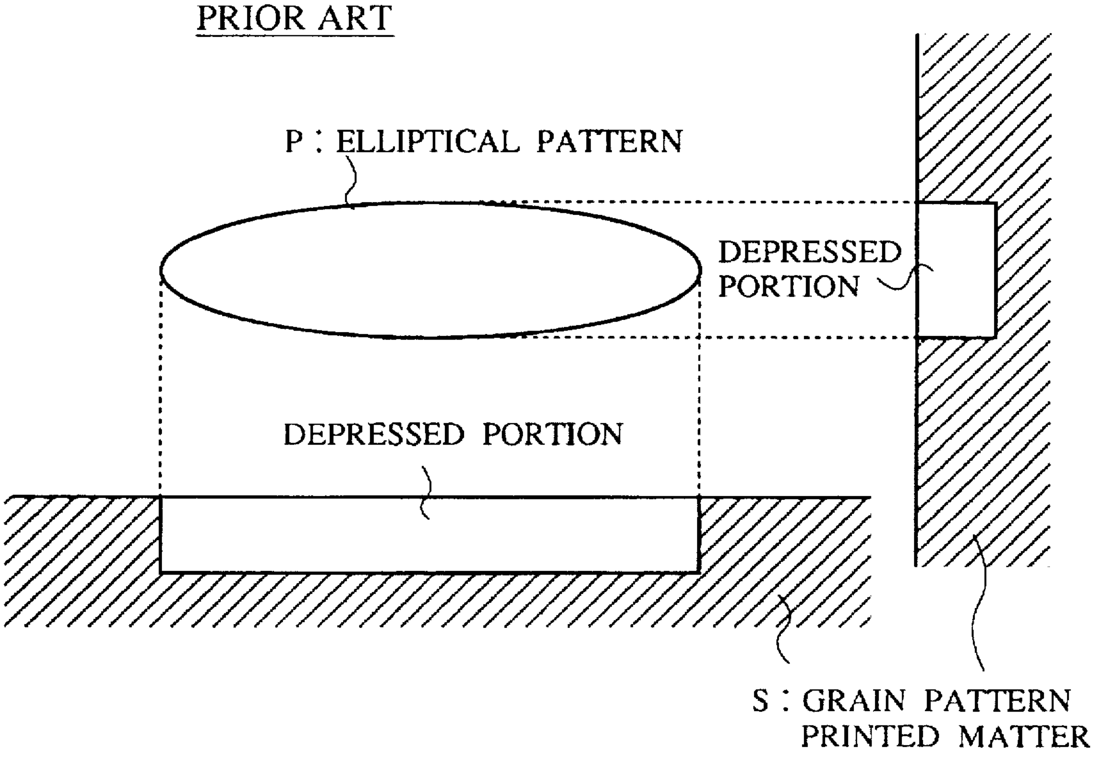
Fig.5 PRIOR ART
FIG. 5 is a view showing a plane pattern and cross sections of a depressed portion of a grain pattern printed sheet by embossing processing using the vessel perforation embossing plate shown in FIG. 4.

When the uneven structure is transferred onto a grain pattern printed matter S (e.g., a sheet of vinyl chloride) by using such a conventional embossing plate E (e.g., the embossing plate E is pressed onto a sheet of vinyl chloride while applying heat), a depressed portion having a shape of the elliptical pattern P when viewed from the plane is formed as shown in FIG. 5. In this case, its depth is substantially uniform (in practice, the portion of the corner is slightly rounded as previously described), and such a depressed portion forms monotonous groove structure. Ordinarily, ink is painted on an internal surface of the depressed portion. However, in the case where the surface of the grain pattern printed matter S is observed, since no depth distribution exists in the formed depressed portion, disposition is somewhat different as compared to the case where a vessel perforation of actual natural wood is observed, so feeling of incompatibility slightly different from natural wood is left.

Figure 6:
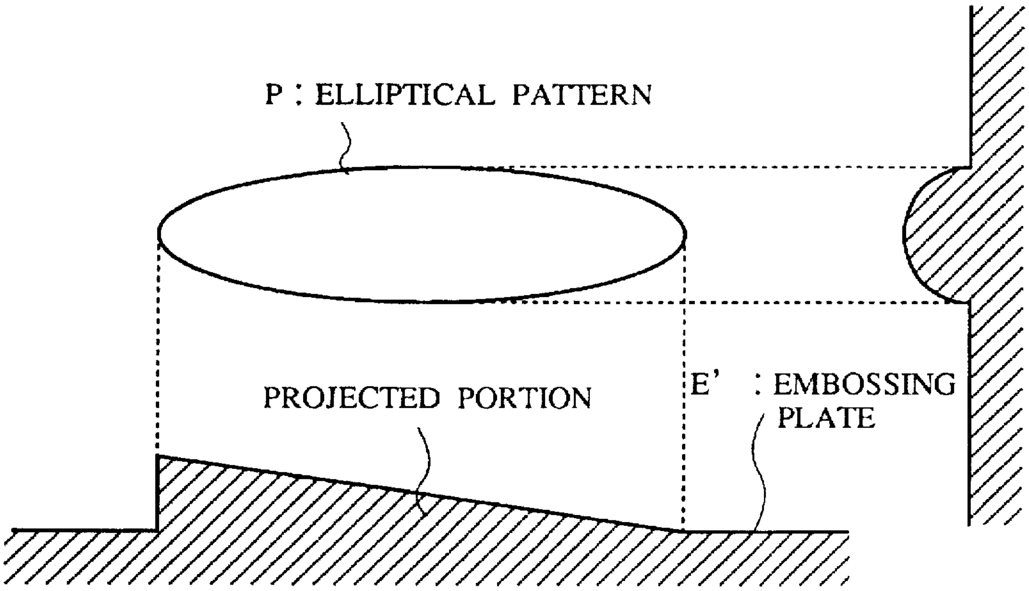
FIG. 6 is a view showing a plane pattern and cross sections of a projected portion of an ideal vessel perforation embossing plate to be prepared by a method of this invention.
Figure 7:
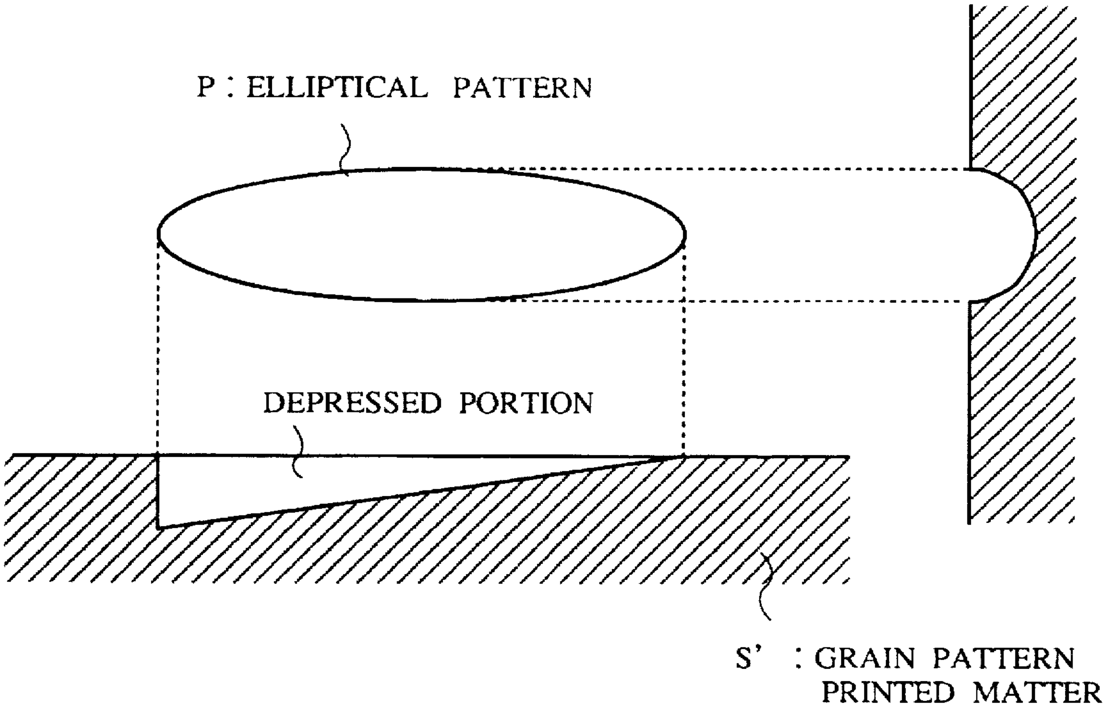
FIG. 7 is a view showing a plane pattern and cross sections of a depressed portion of a grain pattern printed matter obtained by embossing processing using the vessel perforation embossing plate shown in FIG. 6.

In view of the above, in place of the projected portion of the embossing plate E as shown in FIG. 4, let now prepare an embossing plate E' in which a projected portion having inclination as shown in FIG. 6 is formed. The height of the projected portion is such that the right end of the figure is the lowest, and it becomes gradually higher according as a position shifts to the left, and the left end of the figure is the highest. When this uneven structure is transferred onto a grain pattern printed matter S' by using the embossing plate E', a depressed portion having depth distribution is formed as shown in FIG. 7. Namely, the depth of the depressed portion is such that the right end of the figure is the shallowest, and it becomes gradually deeper according as a position shifts to the left, and the left end of the figure is the deepest. Such a depth distribution is in correspondence with the model of natural wood shown in FIG. 3. Also with respect to the minor axis direction of an ellipse, a rounded shape as shown in FIG. 7 is obtained in correspondence with natural wood. Namely, the depressed portion formed on the grain pattern printed matter S' shown in FIG. 7 has a depth distribution in correspondence with vessel perforation of natural wood. Thus, more natural disposition can be obtained in the case of such vessel perforation. One of objects of this invention is to provide a method of preparing an embossing plate provided with a projected portion having a height distribution as shown in FIG. 6 so as to permit an ideal depressed portion having a depth distribution as shown in FIG. 7 to be emboss-formed on a grain pattern printed matter.

§3 Principle for specifying virtual vessel perforation

When a pattern of vessel perforation is extracted by method of photographing, etc. from a grain pattern appearing on a surface of natural timber as described above, information relating to depth of vessel perforation cannot be extracted, but a binary picture merely capable of making distinction between an internal and an exterior of an elliptical pattern (e.g., a picture in which the internal is "black" and the exterior is "white") can be only extracted. In other words, only information of plane contour can be obtained. The operation for specifying virtual vessel perforation described here is an operation for giving information of depth to respective positions on a closed area encompassed by such a contour to prepare a three-dimensional virtual vessel perforation.

Figure 8:
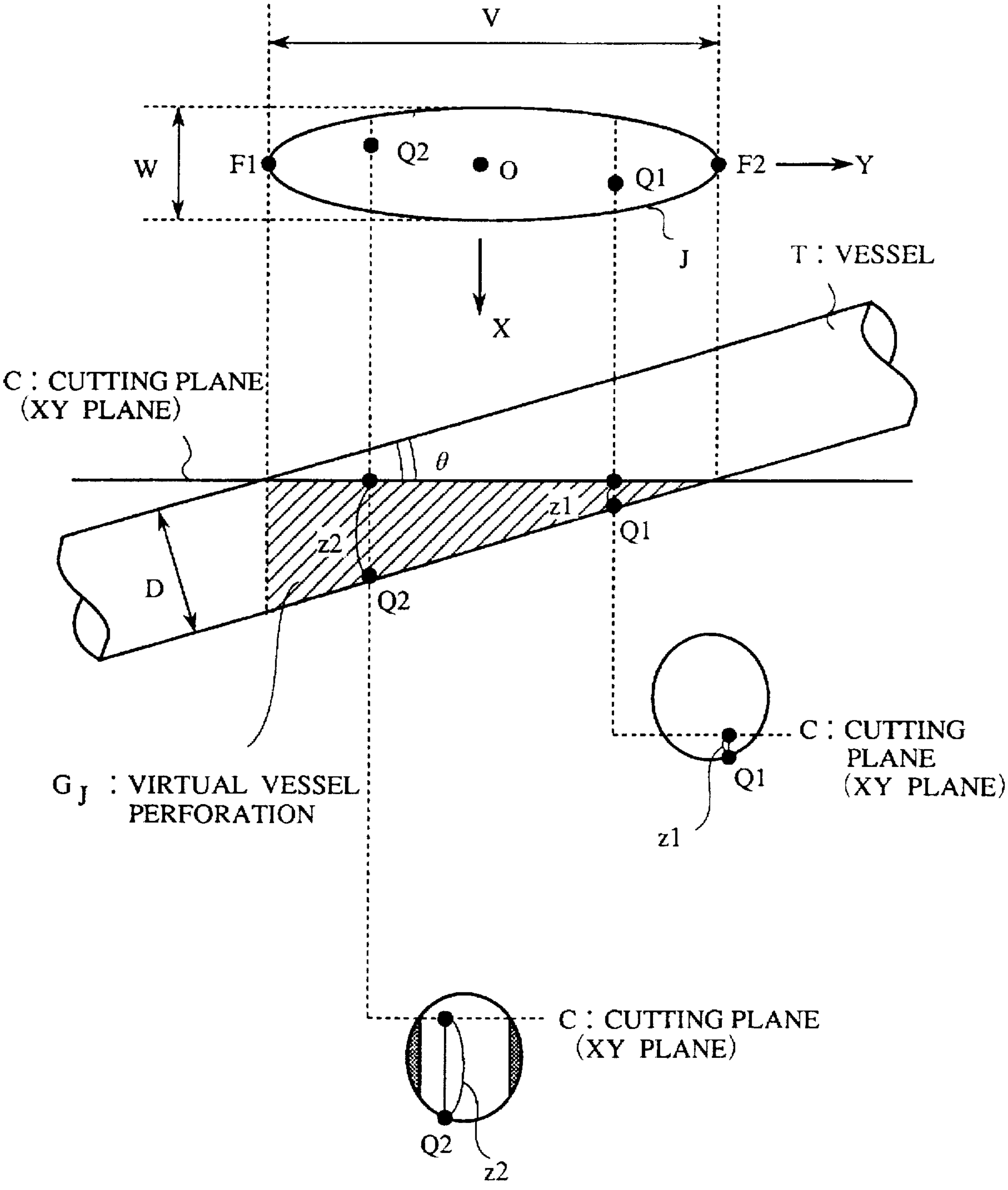
FIG. 8 is a view showing a geometrical model when a vessel is assumed to have a perfect cylindrical shape from a geometrical point of view.

Initially, in order to explain a principle of this operation technique, let consider a geometrical model as shown in FIG. 8. This model is the same as the model shown in FIG. 3, and is a three-dimensional model which holds on the assumption that the vessel T has a perfect geometrical cylindrical shape. In such a model, the cross section of vessel T at cutting plane C becomes an ellipse precise from a geometrical point of view. When it is assumed that diameter of vessel T is D, length of the major axis of ellipse J is V, length of the minor axis thereof is W, and angle that the axial direction of vessel T forms with respect to cutting line C is θ, let examine the relationship between these respective numeric values. As a result, the relationship expressed below holds from a geometrical point of view:

$$W=D$$

$$V=D/\sin\theta$$

This indicates that if ellipse J, which is a cross section pattern, is specified (i.e., length V of the major axis and length W of the minor axis are specified), both diameter D of vessel T and angle θ which forms with respect to cutting plane C are specified. In other words, when an arbitrary ellipse is given, a geometrical model of vessel T and cutting line C such that an ellipse as stated above appears as a cross section pattern is determined. However, it is to be noted that information indicating which side of vessel perforation is deeper cannot be obtained from a plane contour of ellipse. Therefore, strictly speaking, distribution information of depth of perforation (groove) is given, when a sole geometrical model is determined. For example, if ellipse J is given and depth distribution information indicating that position of point F1 is the deepest and position of point F2 is the shallowest is given in FIG. 8, a three-dimensional model as shown in this figure is solely determined. The portion of vessel perforation (hatched portion in FIG. 8) in such a three-dimensional model is called "virtual vessel perforation $G_v$" in this specification. In contrast, in the case where depth distribution information in which position of point F1 is the shallowest and position of point F2 is the deepest is given, even if there is employed a model in which the same ellipse J is caused to be cross section pattern, an inclination of vessel T is opposite to the above. In other word, virtual vessel perforation $G_v$ is deep at the right end and shallow at the left end just opposite to that shown in FIG. 8. In short, it can be said that this "virtual vessel perforation $G_v$" is a virtual three-dimensional perforation determined by extracting only information of a contour from plane ellipse J and carrying out an operation (calculation) on the basis of the extracted contour information.

Let now consider an XYZ three-dimensional coordinate system in which cutting plane C is taken as the XY plane. At this time, if a center point O of the ellipse J is taken as an origin of the coordinate system, the ellipse J becomes a plane graphic (figure) on the XY plane, and depth of vessel perforation is in correspondence with Z coordinate value. For example, when arbitrary points Q1, Q2 on the surface of the vessel T are projected onto the XY plane, points Q1, Q2 are projected at positions as indicated within the ellipse J of FIG. 8. However, these points are points located at positions of depths z1, z2 below the XY plane as a matter of fact. This state is clearly shown in the cross sectional view of the lower part of FIG. 8. However, if diameter D of vessel T and angle θ intersecting with the XY plane are determined, values z1, z2 indicating depths of points Q1, Q2 can be determined by calculation. In other words, a specific value z indicating depth can be determined by calculation with respect to an arbitrary projection point Q (x, y) within ellipse J. In more practical sense, value z can be determined by the following formula:

$$z=((r^2-x^2)^{1/2}-y \sin \theta)/\cos \theta$$

where r=D/2 (radius of vessel T)

$$x^2+z^2 \sin^2\theta \leq r^2$$

From the above-described explanation, the following fact can be understood. Let suppose that vessels of actual natural wood all have cylindrical shape perfect from a geometrical point of view, and a timber plate is obtained by cutting such natural wood with a complete plane. In this case, a vessel perforation cross section pattern appearing on the surface of the timber plate becomes an ellipse perfect from a geometrical point of view, and depths of respective portions of vessel perforation can be obtained by calculation on the basis of only information of the cross section pattern. For example, from a timber plate as shown in FIG. 1, a vessel cross section pattern as shown in FIG. 2 is assumed to be obtained by photographic method, etc. This pattern consists of a large number of ellipses toward length direction L, but does not include information relating to depth of vessel perforation. However, if respective vessel perforations formed in the actual timber plate are observed and information indicating whether the perforation is deep at the left or the right is obtained along length direction L, it is possible to define depth at respective positions within respective elliptical patterns by the above-described technique. When information of contour of closed area and information of depths at respective positions therewithin can be obtained, a virtual three-dimensional perforation will be specified.

§4 Actual calculation for specifying virtual vessel perforation

Meanwhile, the above-described geometrical model cannot be unfortunately applied to vessels of actual natural wood as it is. While a vessel of actual natural wood has cylindrical shape when roughly viewed, it has distorted shape which cannot be said to be geometrical cylinder in strict sense. Accordingly, a vessel cross section pattern actually obtained has not precise elliptical shape, but has somewhat distorted shape. In view of the above, there is employed in practice a technique in which an approximate ellipse is defined to make application of the above-described model.

Figure 9:
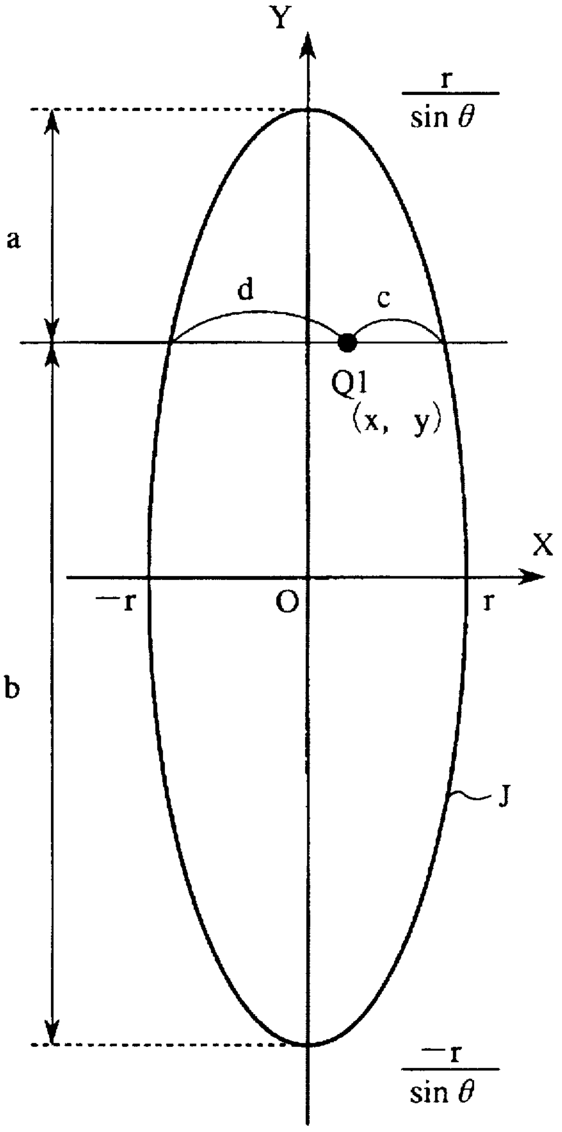
FIGS. 9(*a*), (*b*) are views showing correspondence relationship between a vessel cross section pattern and its approximate ellipse used in the operation (calculation) for specifying virtual vessel perforation.
Figure 9:
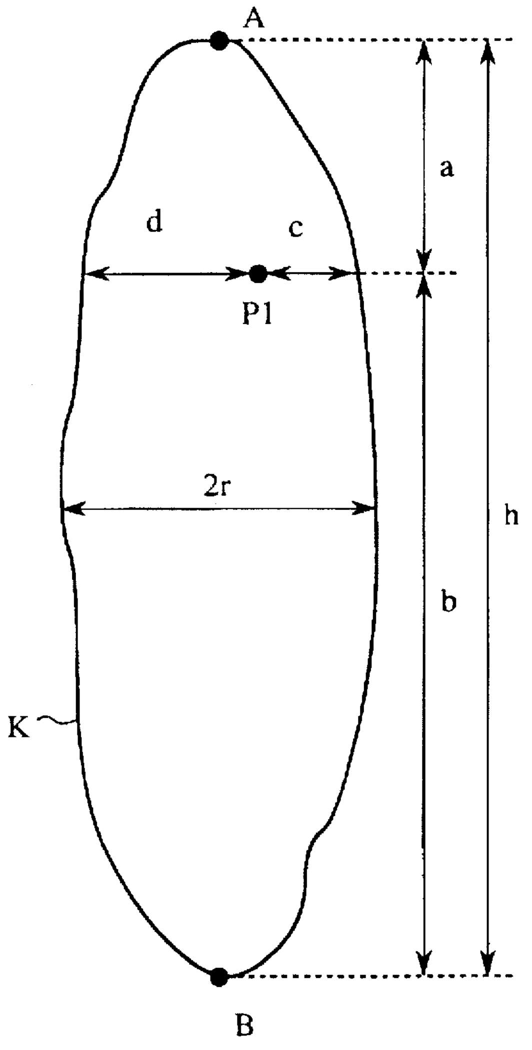

An ellipse J perfect from a geometrical point of view is shown in FIG. 9(*a*), and a somewhat distorted figure K is shown in FIG. 9(*b*). In truth, the ellipse J is an ellipse determined as an approximate ellipse with respect to the figure K. A method of determining such an approximate ellipse is relatively simple. First, length h in length direction of the figure K is determined. In order to determine the length direction of the figure K, for example, the following method can be carried out. That is, a distance between a point A where Y coordinate value is maximum and a point B where Y coordinate value is minimum is calculated. If a particular position where such a distance becomes maximum is searched while rotating the figure K on the XY plane, Y-axis direction in that direction can be determined as a length direction. A distance between points A and B at that time becomes length h in the length direction. Alternatively, in the case of ordinary natural wood, since length directions of a large number of vessel cross section patterns are substantially common, an operator may designate a length direction when inputting pattern of natural wood from a scanner device, etc. In this case, length directions of individual patterns have somewhat deviation with respect to the common length direction, but this is not problem from a viewpoint of practical use. Then, a maximum value of width relating to a direction perpendicular to the length direction is determined. In the case of the figure K shown in FIG. 9(*b*), the maximum value of this width is 2r. In view of this, an ellipse J such that length of the major axis is h and length of the minor axis is 2r is defined, this ellipse J becoming an approximate ellipse with respect to the figure K.

As another method of determining an approximate ellipse, a width at an intermediate point in length direction may be adopted as a length of the minor axis in place of employment of the maximum value of the width. Namely, if length h in length direction is determined, a width of the figure K at a position of length h/2 (width relating to direction perpendicular to the length direction) is determined to allow it to be a length of the minor axis. In addition, it is a matter of course that an approximate ellipse may be determined by any method. Since this approximate ellipse is a geometric figure defined for convenience utilized for carrying out calculation of depth information, it does not become big problem from a viewpoint of practical use even if degree of approximation is somewhat lower.

When an approximate ellipse J is determined, corresponding points are determined within the approximate ellipse J with respect to arbitrary points within the figure K. It should be said that a pair of corresponding points mentioned here are points located at positions relatively corresponding thereto. For example, with respect to one point P1 within the figure K of FIG. 9(*b*), a corresponding point Q1 within the ellipse J of FIG. 9(*a*) is determined. Here, the point P1 and its corresponding point Q1 have the following relationship. Namely, distribution position of the point P1 relating to the length direction of the figure K and distribution position of the corresponding point Q1 relating to the length direction of the ellipse J are equal to each other, and distribution position of the point P1 relating to a direction perpendicular to the length direction of the ellipse K and distribution position of the point Q1 relating to the minor axis direction of the ellipse J are equal to each other. Let demonstrate it in more practical sense. Initially, with respect to position in a vertical direction in the figure, assuming that point P1 is located at the position where a length in the length direction of the figure K is divided by ratio of a:b, point Q1 must be a point existing at the position where a length in the major axis direction of the ellipse J is divided by ratio of a:b. Moreover, with respect to the position in horizontal direction in the figure, assuming that point P1 is located at the position where a width in a horizontal direction of the figure K is divided by ratio of c:d, point Q1 must be also a point existing at the position where the width in the horizontal direction of the ellipse J is divided by ratio of c:d. Corresponding point which satisfies such condition can be determined by simple coordinate calculation.

Meanwhile, since the ellipse J as shown in FIG. 9(*a*) is an ellipse precise from a geometrical point of view, it is possible to apply the geometrical model which has been explained in the §3 thereto. Namely, with respect to an arbitrary point Q1 (x, y) within the ellipse J, depth value z can be determined by calculation. In view of the above, if a depth value z determined with respect to this corresponding point Q1 is defined as it is as a depth value with respect to the original point P1 within the figure K, it is possible to respectively define, by calculation, predetermined depth values with respect to arbitrary points within the figure K. In this invention, the geometrical model which has been described in the §3 is caused to be applied also to a vessel cross section pattern of distorted shape by such a technique thus to obtain information of depth with respect to a vessel perforation cross section pattern obtained from an actual natural wood. If depths at respective positions are determined by calculation in this way, virtual vessel perforation will be specified.

Virtual vessel perforation Gi indicated by hatching in FIG. 8 is a virtual perforation prepared on the basis of the precise ellipse J. On the contrary, a virtual vessel perforation $G_K$ prepared on the basis of the distorted figure K becomes a virtual perforation having distorted three-dimensional shape. Eventually, this "virtual vessel perforation $G_K$" becomes a virtual three-dimensional perforation determined by calculation on the basis of only information of a contour extracted from a natural vessel perforation formed on a surface of a timber plate cut down from natural wood.

It should be noted that while a geometrical model using cylindrical shape is applied as calculation for specifying virtual vessel perforation in the above-described embodiment, a geometrical model using elliptical column or circular cone, etc. may be instead used.

§5 Apparatus for preparing mask data for vessel perforation

Figure 10:
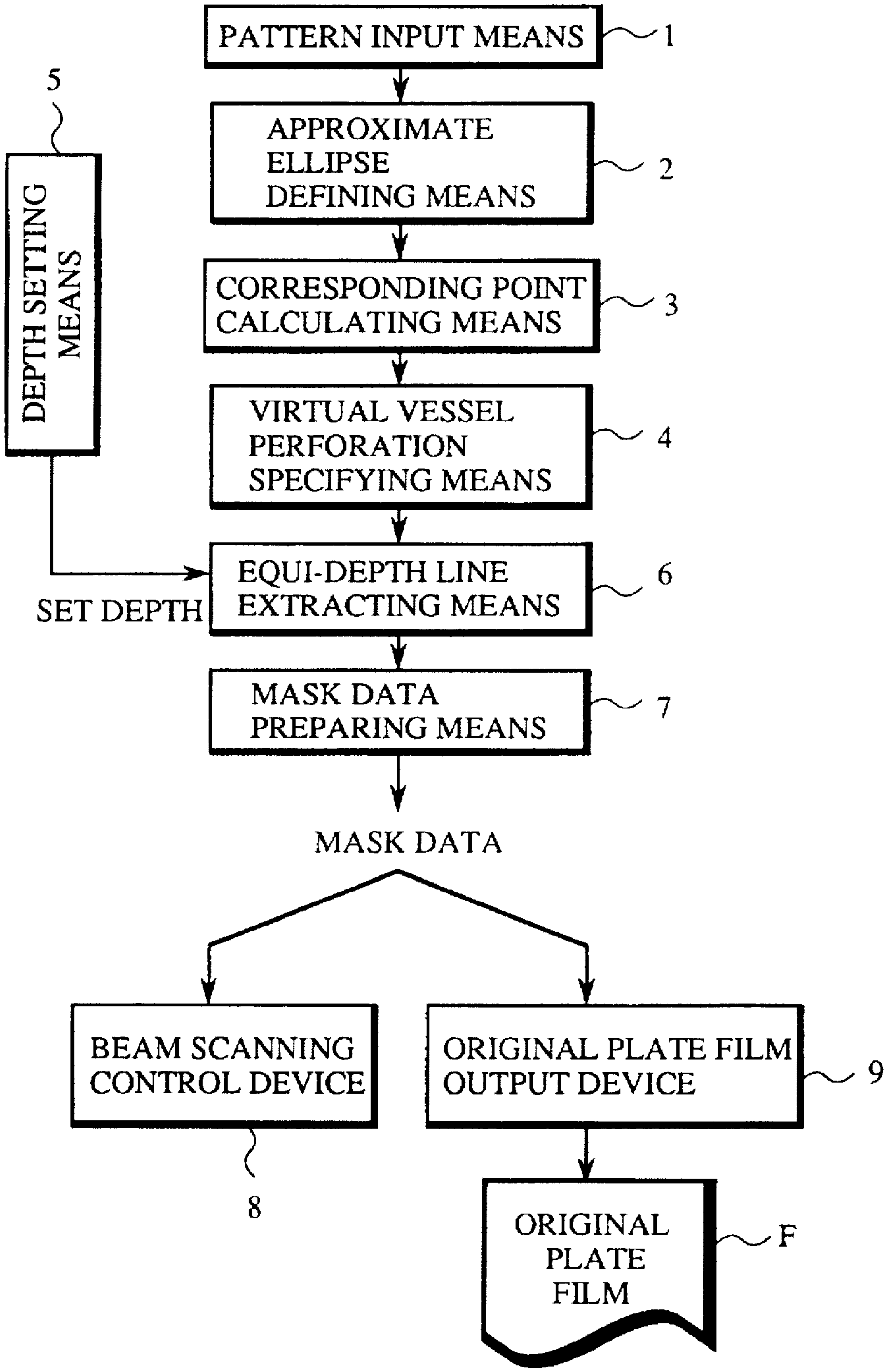
FIG. 10 is a block diagram showing the fundamental configuration of a vessel perforation mask data preparing apparatus according to this invention.

The vessel perforation mask data preparing apparatus according to this invention is an apparatus for specifying a virtual vessel perforation by the calculating technique which has been described in the §3 and §4 to prepare mask data on the basis of the virtual vessel perforation. FIG. 10 is a block diagram showing an example of the configuration of such an apparatus. This apparatus is composed of pattern input means 1 for inputting, as digital picture data, a vessel perforation cross section pattern as shown in FIG. 2, approximate ellipse defining means 2 for defining an ellipse approximate to a contour line of the inputted pattern, corresponding point calculating means 3 for determining corresponding points of which positions are relatively in correspondence with each other within the approximate ellipse with respect to respective positions within a closed area encompassed by the contour line, virtual vessel perforation specifying means 4 for preparing a geometrical cross sectional model of a cylindrical vessel on the basis of lengths of the major axis and the minor axis of the approximate ellipse to determine depths of vessel perforation at respective corresponding point positions determined by the corresponding point calculating means 3 in the above-mentioned geometrical cross section model to specify shape of a virtual vessel perforation, depth setting means 5 for setting plural different depths with respect to the virtual vessel perforation, equi-depth line extracting means 6 for extracting equi-depth lines each consisting of a closed curve every respective set depths, and mask data preparing means 7 for preparing mask data distinctively indicating an internal area encompassed by the equi-depth line and an external area existing outside the internal area. As described in detail later, the mask data prepared in this way is delivered to beam scanning control device 8 so that it is used for controlling scanning of beams for exposure, or is delivered to an original plate film output device 9 so that it is used as data for preparing an original plate film F.

In this apparatus, the pattern input means 1 is a picture input means such as scanner unit, etc., and the approximate ellipse defining means 2, the corresponding point calculating means 3, the virtual vessel perforation specifying means 4, the depth setting means 5, the equi-depth line extracting means 6, and the mask data preparing means 7 are means realized by computer.

The operation of this apparatus will be described below in conformity with a more practical example. Here, processing up to process step for preparing mask data on the basis of grain pattern of a surface of a timber plate cut down from natural wood as shown in FIG. 1 will be described. First, grain pattern of the surface of such timber plate is photographed to take, by pattern input means 1, such grain pattern thereinto as digital data. The grain pattern thus taken in consists of a large number of cross section patterns with respect to a large number of vessel perforations (elliptical vessel patterns), but information relating to depth of vessel perforation is not included in the digital data as previously described. For example, this picture is only a binary picture such that the internal portion of the cross sectional pattern is "black" and the external portion thereof is "white".

In the approximate ellipse defining means 2, approximate ellipses are determined with respect to such is respective cross sectional patterns. In the case where an inputted cross section pattern is a figure K as shown in FIG. 9(*b*), an approximate ellipse J (shown in FIG. 9(*a*)) corresponding thereto is determined by the previously described technique. Further, corresponding points with respect to respective points within the figure K are determined by the corresponding point calculating means 3. Since picture data are dealt in pixel units within the computer, the corresponding point calculating means 3 performs calculation for determining corresponding points in respective pixel units. In this case, it is sufficient that, e.g., a central point of a pixel is handled as a representative position of that pixel. When corresponding points with respect to respective pixels constituting the figure K are determined, a virtual vessel perforation is specified by the virtual vessel perforation specifying means 4. Namely, when depths are determined with respect to the determined respective corresponding points by geometrical calculation, a virtual perforation $G_K$ will be specified.

Figure 11:
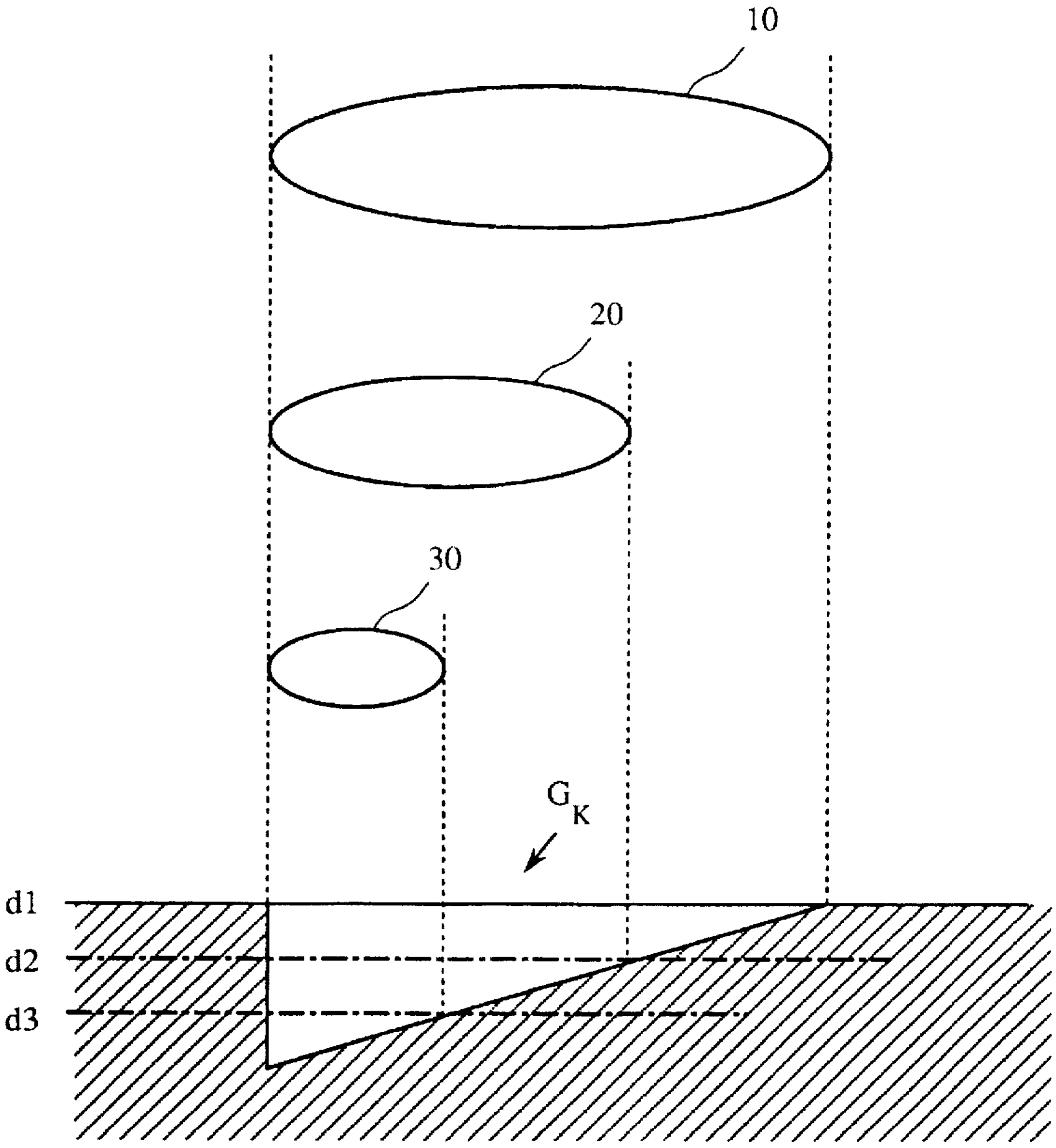
FIG. 11 is a view showing equi-depth lines 10, 20, 30 every respective depths obtained when three depths d1, d2, d3 are set with respect to a virtual vessel perforation Gk.

Then, several depth values are set by the depth setting means 5. Explanation will be given below in connection with the case where a virtual vessel perforation $G_K$ having a cross section as shown at the lower part of FIG. 11 is specified and three kinds of depths d1, d2, d3 are set. In this apparatus, mask data will be prepared by a number of set depths. According as such depth setting is carried out more finely (i.e., the number of set values of depth is increased to more degree), the number of mask data prepared is increased accordingly. From a theoretical point of view, if a larger number of mask data are used, an embossing plate having uneven structure closer to natural vessel perforation structure can be made in correspondence therewith. However, according as the number of mask data is increased to more degree, the number of working process steps for preparing embossing plate is increased accordingly. It is sufficient that, from a viewpoint of practical use, two or three kinds of depth settings are carried out to prepare two or three mask data.

Figure 12:
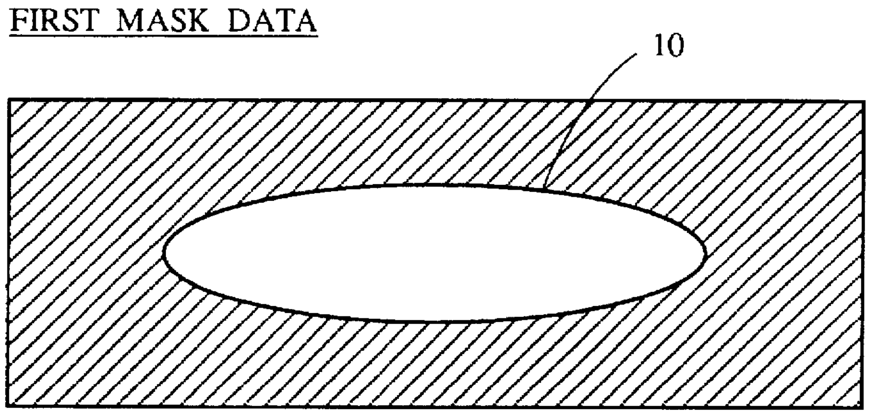
FIG. 12 is a plan view showing first mask data obtained on the basis of the equi-depth line 10 shown in FIG. 11.
Figure 13:
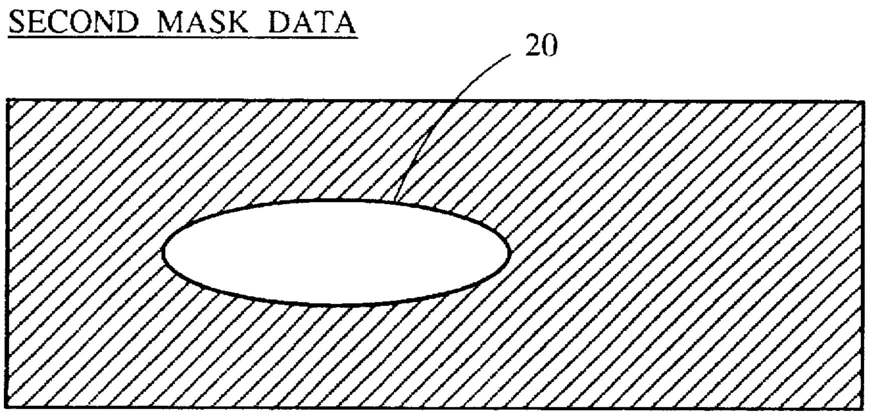
FIG. 13 is a plan view showing second mask data obtained on the basis of the equi-depth line 20 shown in FIG. 11.
Figure 14:
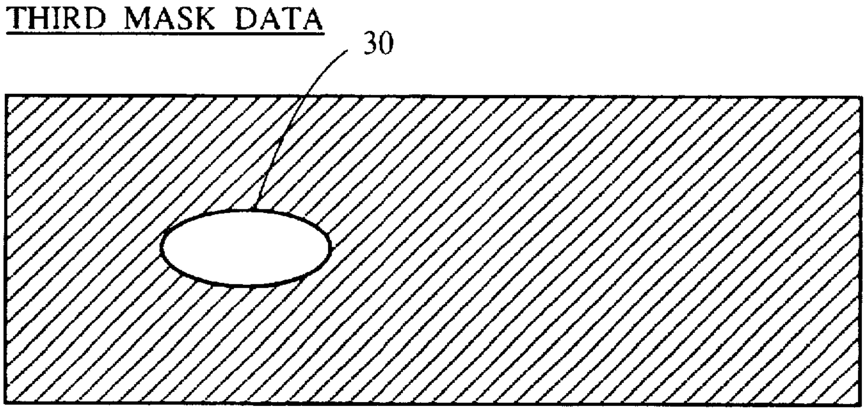
FIG. 14 is a plan view showing third mask data obtained on the basis of the equi-depth line 30 shown in FIG. 11.

When such a depth setting is made, equi-depth lines of virtual vessel perforation $G_K$ are extracted every respective set depths. For example, in the case of the example shown in FIG. 11, equi-depth lines 10, 20, 30 are respectively extracted with respect to depths d1, d2, d3. While these equi-depth lines have not precise elliptical shape in truth, but have distorted shape, they are indicated by complete ellipse in the figure for the brevity of illustration. In the virtual vessel perforation specifying means 4, all three-dimensional information of the virtual vessel perforation $G_K$ has already been specified. Accordingly, if these three-dimensional information are utilized, processing for extracting equi-depth lines can be automatically carried out by calculation. When equi-depth lines are extracted in this way, mask data is prepared at the mask data preparing means 7. For example, first mask data as shown in FIG. 12 is prepared from the equi-depth line 10 shown in FIG. 11, second mask data as shown in FIG. 13 is prepared from the equi-depth line 20 shown in FIG. 11, and third mask data as shown in FIG. 14 is prepared from the equi-depth line 30 shown in FIG. 11. As "mask data", there may be employed data in any form capable of distinctively indicating an internal portion of a closed area encompassed by the equi-depth line and the external portion thereof. In this embodiment, mask data in the form of binary raster data is prepared. For example, in the first mask data shown in FIG. 12, data is constituted by bit information indicating "black pixel" with respect to pixels positioned in the external area to which hatching is implemented in the figure and "white pixel" with respect to pixels positioned in the internal area of the equi-depth line 10.

The apparatus shown in FIG. 10 delivers the mask data prepared in this way to the beam scanning control device 8 or the original plate film output device 9. For example, when the first mask data shown in FIG. 12 is delivered to the beam scanning control device 8, a control such that beams for exposure scan only the area of "white pixel" within the equi-depth line 10 (or a control such that those beams scan only the area of "black pixel" outside the equi-depth line 10 in a manner opposite to the above) is executed. In addition, when the first mask data is delivered to the original plate film output device 9, an original plate film F such that the area of "white pixel" inside the equi-depth line 10 has light transmission characteristic and the area of "black pixel" outside the equi-depth line 10 has light shielding characteristic (or an original plate film having property (characteristic) opposite to the above) is outputted.

§6 Method of preparing embossing plate

A process for preparing an actual embossing plate will now be described in accordance with process step cross sectional views of FIGS. 15 to 29 on the premise that three kinds of mask data as shown in FIGS. 12 to 14 are prepared. It is to be noted that while mask data shown in FIGS. 12 to 14 are mask data with respect to a single vessel perforation, and a process for preparing an embossing plate which will be described below is also a process for forming an uneven structure for a single vessel perforation, this is employed for convenience of explanation as a matter of course, and in actual process, mask data with respect to a large number of vessel perforations will be prepared on the same plane, and uneven structure for a large number of vessel perforations are formed at the same time on the embossing plate.

<First patterning process>

Figure 15:
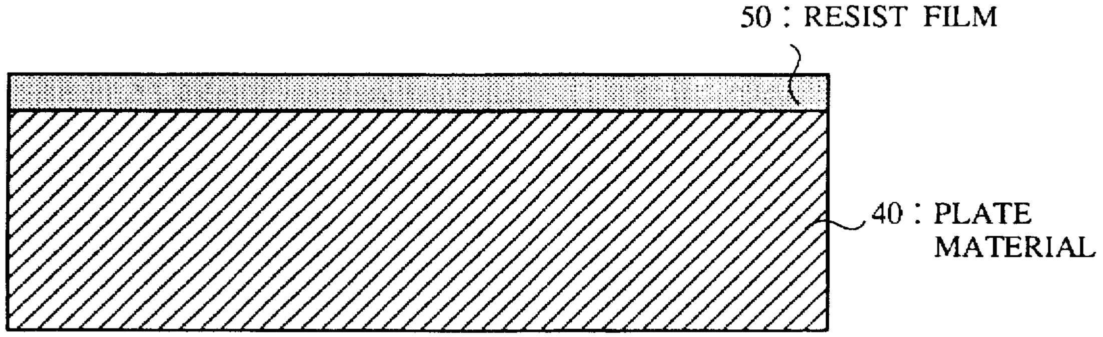
FIG. 15 is a cross sectional view showing the state where a resist film 50 is formed on a plate material 40 at the first patterning process in the method of preparing a vessel perforation embossing plate according to this invention.
Figure 16:
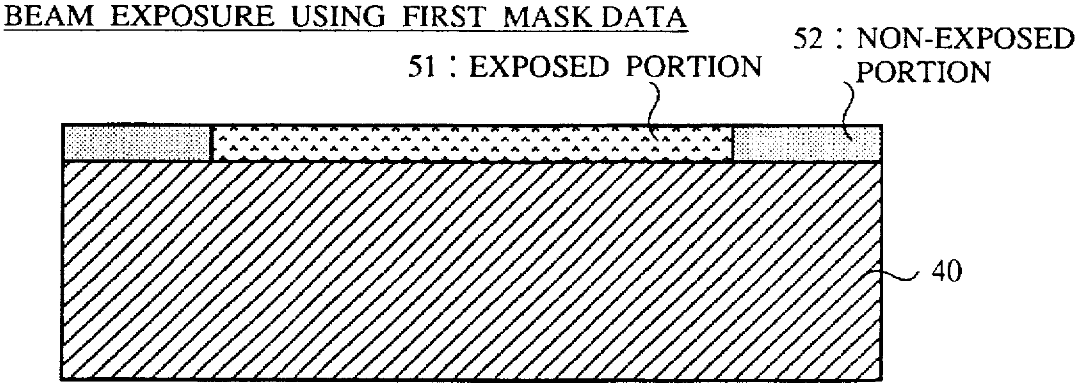
FIG. 16 is a cross sectional view showing the state where exposure by beam scanning with respect to the resist film 50 is carried out by using the first mask data in the state shown in FIG. 15.

Initially, as shown in FIG. 15, a resist film 50 is formed on a surface of a plate material 40 which serves as material of an embossing plate. While a copper plate is used in this example as the plate material 40, any material suitable for performing the function as the embossing plate may be used (metal such as copper or iron, etc. is preferable because etching process is carried out later). Moreover, resist film 50 may be formed by any resist agent as long as material functioning as a protective film at later etching process is employed. Generally, as a resist agent, there are negative type resist agent in which exposed portion is hardened and positive type resist agent in which exposed portion is dissolved (solved out) by development. A resist agent of any type may be employed. Here, the embodiment using the negative type resist will be described below. Namely, in this embodiment, resist film 50 consisting of negative type resist of dichromated gelatin is formed on the surface of plate material 40 comprised of copper plate. Also as the process for forming resist film 50, any method may be used. Resist agent may be directly coated on the surface of plate material 40, or a resist transfer film such as so called pigment paper, etc. may be used to transfer-form resist film. Moreover, as the negative type resist, in addition to the above, monomer or prepolymer of acrylicester having acryloyl or methaacryloyl in molecule, mixture of bis asido and diene polymer, polyvinyl cinnamate compound, etc. may be used.

Figure 17:
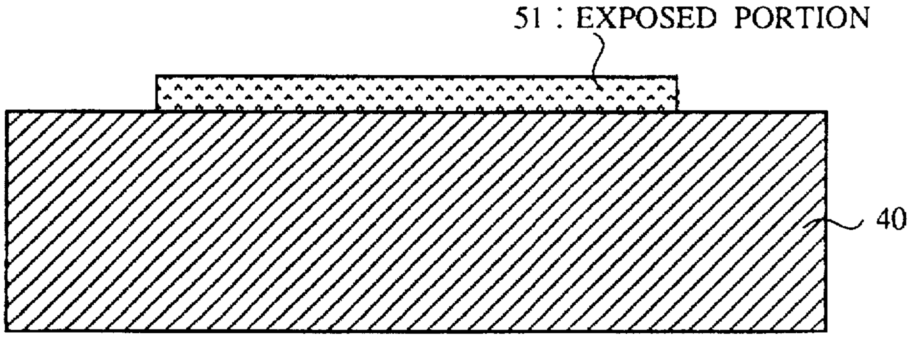
FIG. 17 is a cross sectional view showing the state where a non-exposed portion 52 is removed by developing the resist film in the state shown in FIG. 16.

Subsequently, first mask data (see FIG. 12) prepared with respect to the shallowest depth d1 is used to allow the resist film 50 to be exposed to light. In this embodiment, since the negative type resist is used, scanning of beams for exposure (e.g., laser beams) is controlled so that only the internal area of the equi-depth line 10 in the first mask data is caused to be exposed to light (in the case where positive type resist is used, only the external area of the equi-depth line 10 is caused to be exposed to light in a manner opposite to the above). By this exposure process, the resist film 50 is divided into an exposed portion 51 (area corresponding to the internal portion of the equi-depth line 10) and a non-exposed portion 52 (area corresponding to the external portion of the equi-depth line 10). When this resist is developed by hot water, unhardened non-exposed portion 52 is dissolved (solved out) and is removed. Thus, only hardened exposed portion 51 is left as shown in FIG. 17.

Figure 18:
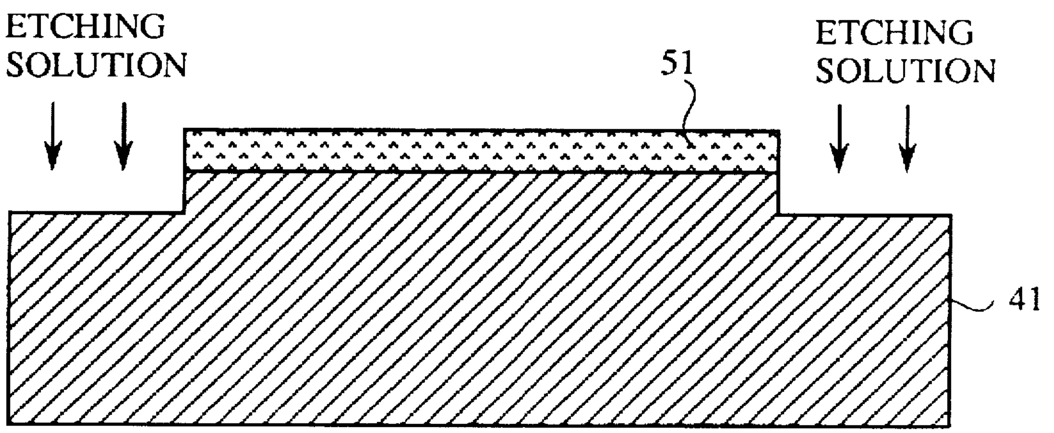
FIG. 18 is a cross sectional view showing the state where etching is carried out with exposed portion 51 of the remaining resist being as a protective film in the state shown in FIG. 17.
Figure 19:
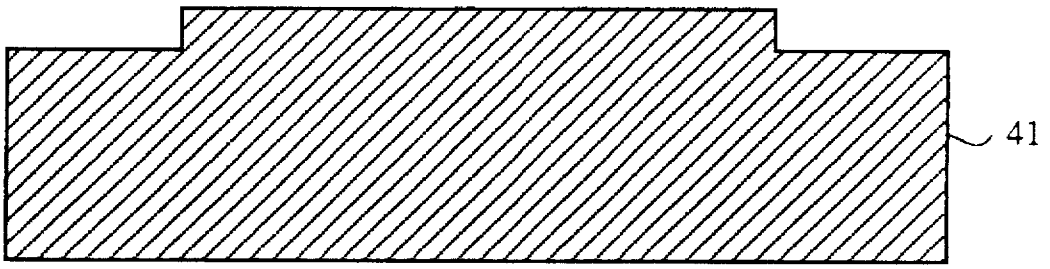
FIG. 19 is a cross sectional view showing the state where the resist film is removed from the state shown in FIG. 18.

Then, as shown in FIG. 18, etching is carried out from the surface with the remaining exposed portion 51 being as a protective film. In this embodiment, ferric chloride solution is used as etchant (etching solution). Thus, the surface exposed portion of the plate material 40 is etched and eliminated. As a result, the shape of the plate material 40 is changed in a manner of a plate material 41. When the exposed portion 51 which is the remaining resist layer is peeled (separated) and is removed after etching process is completed, a structure as shown in FIG. 19 is obtained. By such a first patterning process, a projected portion corresponding to the internal area of the equi-depth line 10 of the first mask data is formed on the upper surface of the plate material 41.

<Second patterning process>

Figure 20:
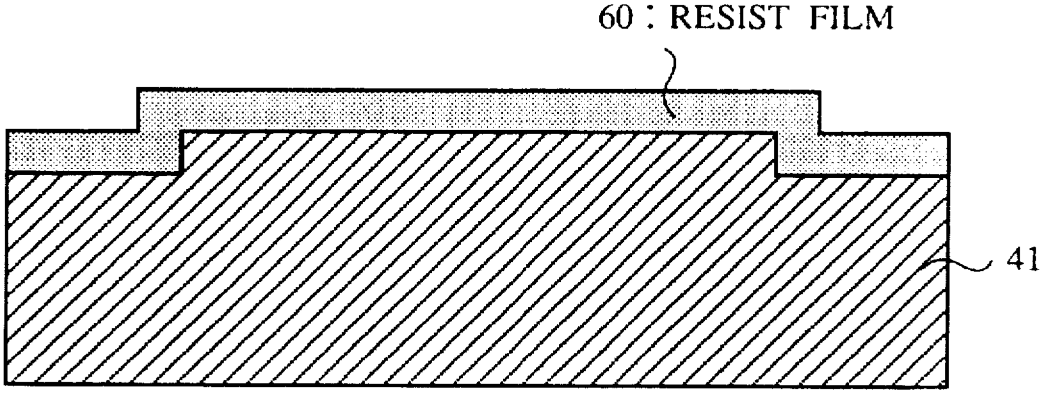
FIG. 20 is a cross sectional view showing the state where a resist film 60 is formed on the plate material 41 at the second patterning process in the method of preparing a vessel perforation embossing plate according to this invention.
Figure 21:
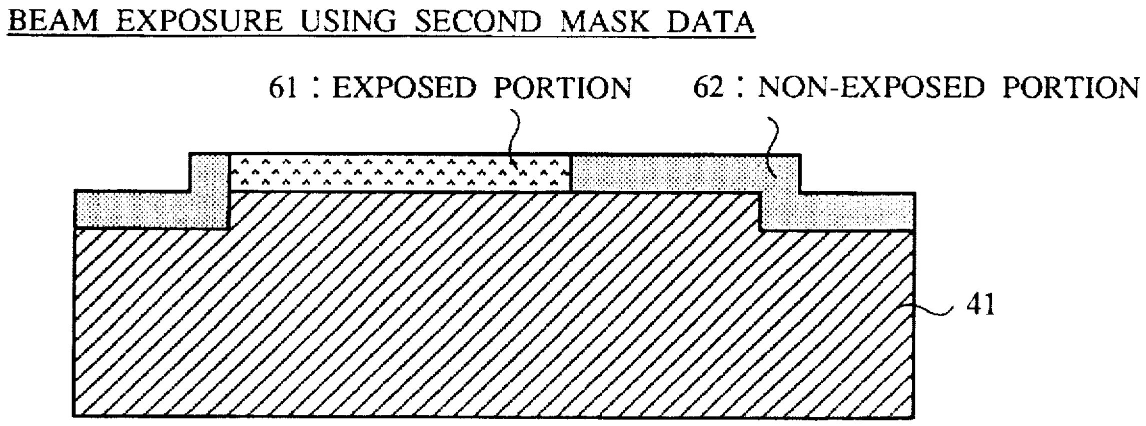
FIG. 21 is a cross sectional view showing the state where exposure by beam scanning with respect to the resist film 60 is carried out by using the second mask data in the state shown in FIG. 20.
Figure 22:
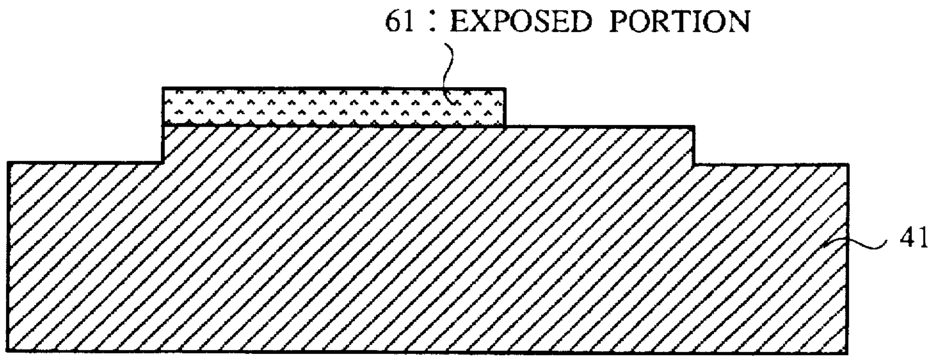
FIG. 22 is a cross sectional view showing the state where a non-exposed portion 62 is removed by developing the resist film in the state shown in FIG. 21.

A negative type resist film 60 is formed similarly to the last time on the surface of plate material 41. Thus, a structure shown in FIG. 20 is obtained. Subsequently, the second mask data (see FIG. 13) prepared with respect to the next depth d2 is used to allow the resist film 60 to be exposed to light. Since the negative type resist is similarly used at this process step, scanning of beams for exposure is controlled so that only the internal area of equi-depth line 20 in the second mask data is caused to be exposed to light (in the case where positive type resist is used, only the external area of the equi-depth line 20 is caused to be exposed to light in a manner opposite to the above). By this exposure process, the resist film 60 is divided into an exposed portion 61 (area corresponding to the internal portion of the equi-depth line 20) and a non-exposed portion 62 (area corresponding to the external portion of the equi-depth line 20) as shown in FIG. 21. When this resist is developed by hot water, unhardened non-exposed portion 62 is dissolved (solved out) and is removed. Thus, only the hardened exposed portion 61 is left as shown in FIG. 22.

Figure 23:
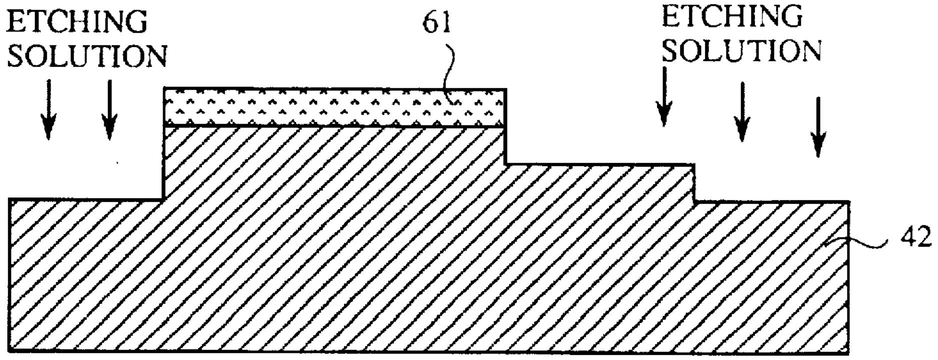
FIG. 23 is a cross sectional view showing the state where etching is carried out with an exposed portion 61 of the remaining resist being as a protective film in the state shown in FIG. 22.
Figure 24:
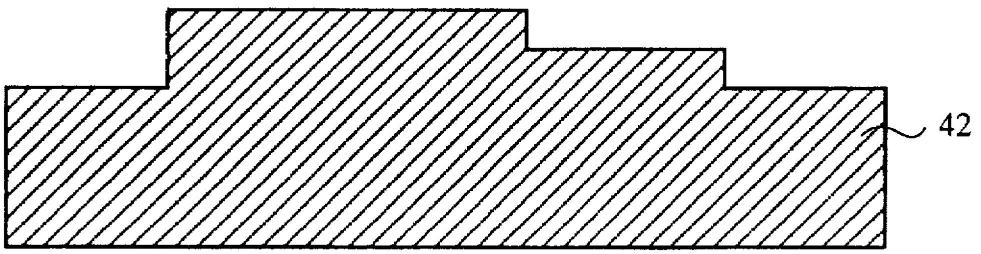
FIG. 24 is a cross sectional view showing the state where the resist film is removed from the state shown in FIG. 23.

Then, as shown in FIG. 23, with the remaining exposed portion 61 being as a protective layer, etching for allowing ferric chloride solution to react from the surface is carried out. Thus, the surface exposed portion of the plate material 41 is etched and is removed. Thus, the shape of the plate material 41 changes in a manner of a plate material 42. When the exposed portion 61 serving as the remaining resist layer is peeled (separated) and is removed after etching process is completed, a structure as shown in FIG. 24 is obtained. As stated above, by the second patterning process subsequent to the first patterning, such a structure that the projected portion corresponding to the internal area of equi-depth line 20 of the second mask data is further stacked in a stair-step form on the projected portion corresponding to the internal area of the equi-depth line 10 of the first mask data will be formed on the upper surface of the plate material 42.

<Third patterning process>

Figure 25:
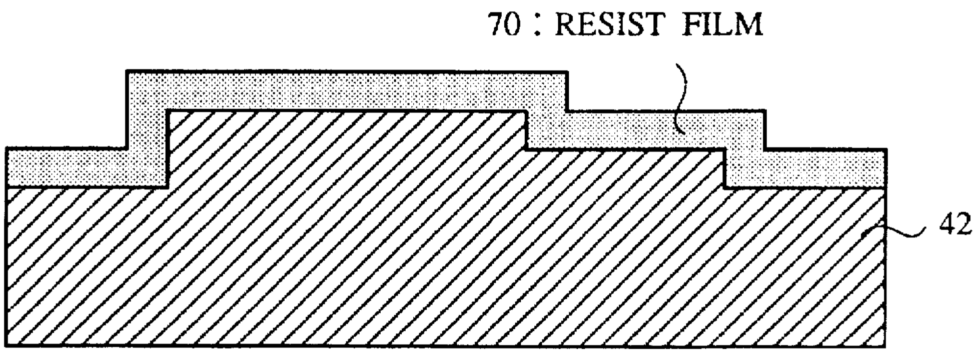
FIG. 25 is a cross sectional view showing the state where resist film 70 is formed on the plate material 42 at the third patterning process in the method of preparing a vessel perforation embossing plate according to this invention.
Figure 26:
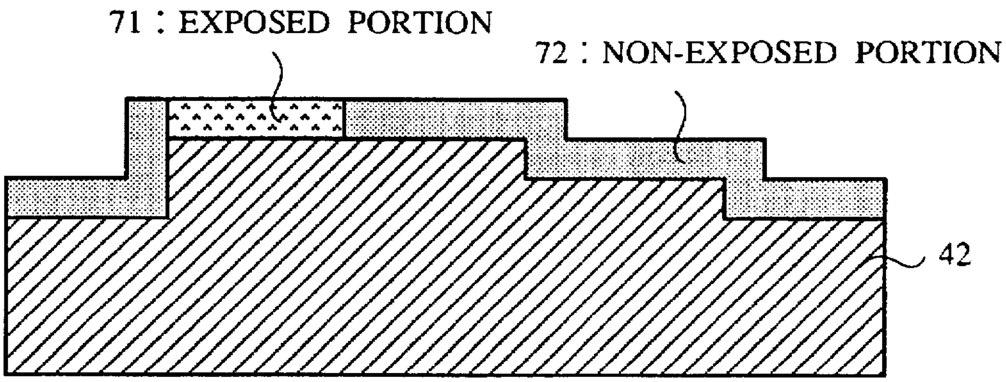
FIG. 26 is a cross sectional view showing the state where exposure by beam scanning with respect to the resist film 70 is carried out by using the third mask data in the state shown in FIG. 25.

Now, a negative type resist film 70 is formed similarly to the last time on the surface of plate material 42 to obtain a structure shown in FIG. 25. Subsequently, the third mask data (see FIG. 14) prepared with respect to the deepest depth d3 is used to allow the resist film 70 to be exposed to light. Since the negative type resist is similarly used at this process step, scanning of beams for exposure is controlled so that only the internal area of the equi-depth line 30 in the third mask data is caused to be exposed to light (in the case where positive type resist is used, only the external area of the equi-depth line 30 is caused to be exposed to light in a manner opposite to the above). By this exposure process, the resist film 70 is divided into an exposed portion 71 (area corresponding to the internal portion of the equi-depth line 30) and a non-exposed portion 72 (area corresponding to the external portion of the equi-depth line 30) as shown in FIG. 26.

Figure 27:
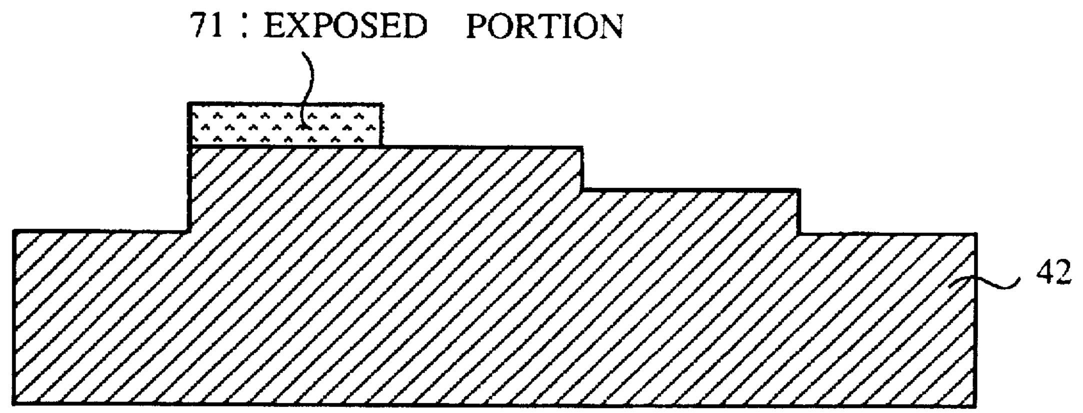
FIG. 27 is a cross sectional view showing the state where a non-exposed portion 72 is removed by developing resist film in the state shown in FIG. 26.

When this resist is developed by hot water, unhardened non-exposed portion 72 is dissolved (solved out) and is removed. Thus, only hardened exposed portion 71 is left as shown in FIG. 27.

Figure 28:
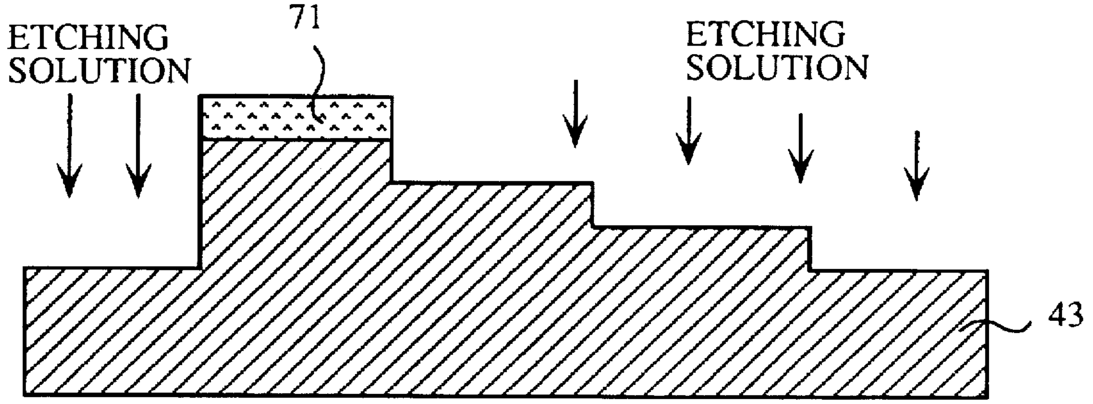
FIG. 28 is a cross sectional view showing the state where etching is carried out with the exposed portion 71 of the remaining resist being as a protective film in the state shown in FIG. 27.
Figure 29:
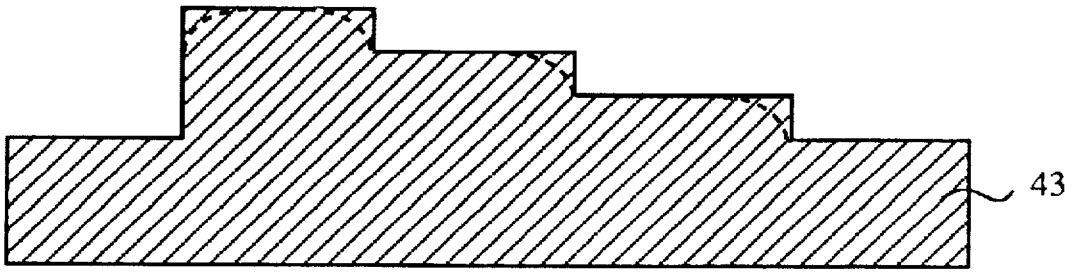
FIG. 29 is a cross sectional view of embossing plate 43 obtained by removing the resist film from the state shown in FIG. 28.

Then, as shown in FIG. 28, with the remaining exposed portion 71 being as a protective film, etching for allowing ferric chloride solution to react from the surface is carried out. Thus, the surface exposed portion of the plate material 42 is etched and is removed. The shape of the plate material 42 changes in a manner of a plate material 43. When the exposed portion 71 serving as the remaining resist layer is peeled and is removed after etching process is completed, a structure as shown in FIG. 29 is obtained. As stated above, by the third patterning process subsequent to the first patterning and the second patterning, an offset protruded (raised) body such that the projected portion corresponding to the internal area of the equi-depth line 20 of the second mask data is stacked in a stair-step form on the projected portion corresponding to the internal area of the equi-depth line 10 of the first mask data, and the projected portion corresponding to the internal area of the equi-depth line 30 of the third mask data is stacked in a stair-step form thereon will be formed on the upper surface of the plate material 43.

The plate material 43 obtained in this way becomes an embossing plate to be finally prepared. It is to be noted that since cross sectional views are depicted in the above-described respective process step diagrams on the premise that etching of the plate material in the etching process is advanced only in a lower direction, illustration is made such that the stair-step shaped uneven structure is formed on the upper surface of the final plate material 43. However, since etching advancement direction in the etching process is diversely distributed, offset in stair-step form is such that the corners are somewhat smooth. Thus, a protruded (raised) structure as indicated by broken lines in FIG. 29 is obtained. In this case, rounding indicated by broken lines is varied in dependency upon mechanical specification of etching unit, chemical composition of material which participate in etching, the number of steps (the number of mask data used), and etching time at the etching process using respective mask data, etc. The embossing plate 43 having such a protruded structure has a structure similar to the ideal embossing plate E' shown in FIG. 6. Namely, if transferring process of uneven structure is carried out by using this embossing plate 43, a perforation (groove) structure having a depth distribution close to a natural vessel perforation is obtained as shown in FIG. 7.

<Method using original plate film>

Figure 30:
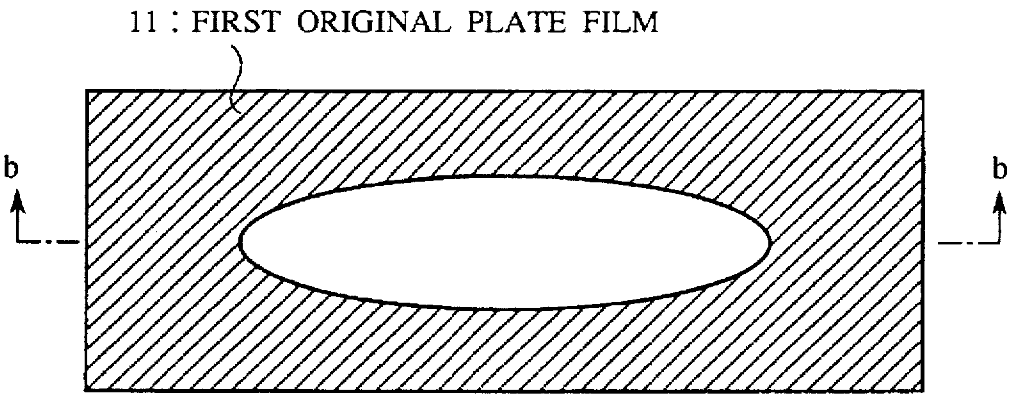
FIGS. 30(*a*) and (*b*) are a plan view and a cross sectional view showing an example of an original plate film used in the method of preparing a vessel perforation embossing plate according to this invention.
Figure 30:
Figure 31:
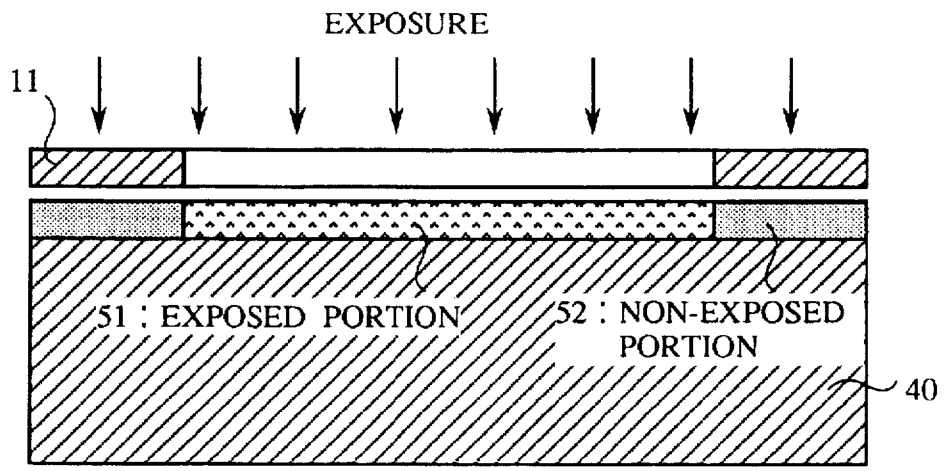
FIG. 31 is a cross sectional view showing exposure process using the original plate film shown in FIG. 30.

While, in the above-described process, beam scanning is controlled on the basis of prepared mask data to carry out exposure onto resist film, exposure using original plate film may be conducted in place of beam scanning. For example, in the case where the first patterning is carried out, a first negative original plate film 11 as shown in FIG. 30 is prepared. FIG. 30(*a*) is a top view of the original plate film 11, wherein the central elliptical portion is an area having light transmission property and the peripheral portion to which hatching is implemented is an area having light shielding property. FIG. 30(*b*) is a cross sectional view cut along cutting lines b—b of the original plate film 11. In order to carry out exposure using the original film 11, it is sufficient to form, as shown in FIG. 15, the negative type resist film 50 on the plate material 40 thereafter to mount the first original plate film 11 thereon to carry out, as shown in FIG. 31, exposure through the original plate film 11. The portion through which light is transmitted becomes an exposed portion 51 and the portion where light is shielded becomes a non-exposed portion 52. Other process steps are entirely the same as the above-described process steps. It is to be noted that a positive original plate film and a positive type resist may be used in place of the negative original plate film and the negative type resist.

§7 Separation processing of vessel cross section pattern

Figure 32:
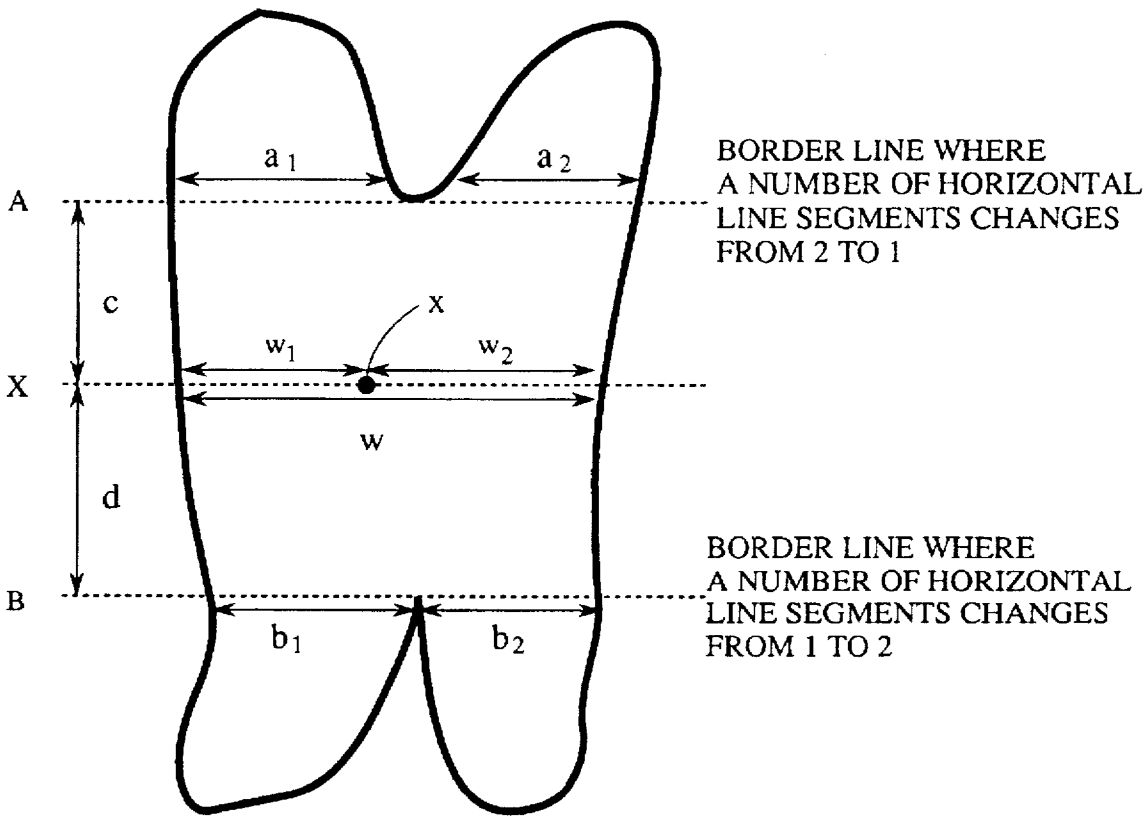
FIG. 32 is a view showing an example of a merged pattern found in an actual vessel cross section pattern.

Discussion has been made until now on the premise that vessel cross section pattern obtained by the photographing method, etc. from natural wood has a shape substantially similar to ellipse. Certainly, in the case where a single vessel is cut, its cut end becomes substantially elliptical. However, in some natural woods, there are portions such that two vessels are merged. With respect to such portions, as shown in FIG. 32, its cut end is caused to have a complicated shape such that two elliptical patterns are merged. Moreover, in actual natural woods, there are instances where in the case where two vessel cross sectional patterns are located very close to each other even if they are not merged, those two patterns may be merged at the stage where optical processing such as photographing, etc. is implemented. In the case where the calculating processing of the §4 is implemented to such merged pattern, unless the merged pattern is separated into two pattern portions, correct processing would fail. For example, in the case of a pattern as shown in FIG. 32, if the human being observes such pattern by eyes, he can recognize that two elliptical patterns are merged. However, with the uniform processing by computer, an approximate ellipse would be determined with respect to the entirety of the merged pattern. In view of the above, it is preferable to find out, prior to depth calculation processing, such a merged pattern by a method as described below to carry out separation processing.

Initially, let try carrying out processing, of scanning the pattern shown in FIG. 32 in a horizontal direction, in order from the top toward the bottom thereof. Consequently, two sets of horizontal line segments a1, a2 exist on the scanning line at the portion above the line A, whereas only one horizontal line segment exists on the scanning line at the portion below the line A. However, in a manner opposite to the above, only one horizontal line segment existed on the scanning line at the portion above the line B, whereas two sets of horizontal line segments b1, b2 appear on the scanning line at the portion below the line B. Accordingly, in the case where the number of horizontal line segments varies in a manner of 2, 1 and 2, that pattern can be recognized as a merged pattern. By such a technique, it is possible to find out a merged pattern.

Figure 33:
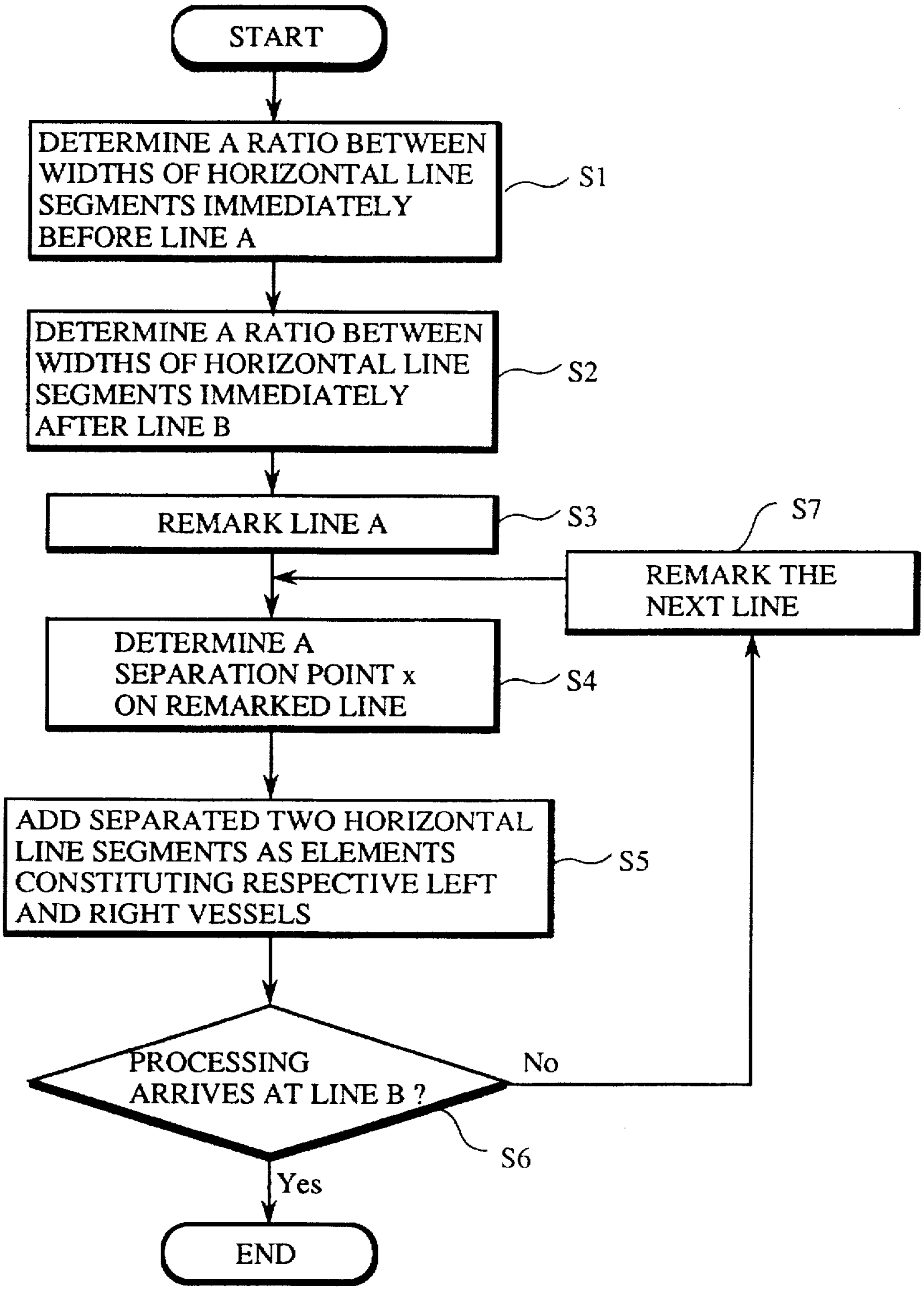
FIG. 33 is a flowchart indicating separation processing procedure of a merged pattern as shown in FIG. 32.

If the merged pattern is found out, this pattern is separated into two pattern portions in accordance with the procedure indicated by the flowchart of FIG. 33. First, at step S1, ratio between widths of horizontal line segments immediately before the line A (immediately before merge) is determined. In this example, ratio of a1:a2 will be determined. Subsequently, at step S2, ratio between widths of horizontal line segments immediately after the line B (immediately after branch) is determined. In this example, ratio of b1:b2 will be determined. On the basis of these ratios, separation points x will be determined within the segment of lines A to B. Initially, at step S3, attention is drawn to the line A (the line A is remarked). Then, at step S4, a separation point x is determined on the remarked line. At step S5, separated two horizontal line segments are added as elements constituting respective left and right vessels. This processing is repeated by one line via steps S6 to S7. When this processing arrives at the line B, processing is completed.

Here, separation point x at step S4 may be determined as follows. Namely, when it is assumed as shown in FIG. 32 that total width on an arbitrary line X is w, width of the horizontal line segment on the left side of the separation point x is w1, and width of the horizontal line segment on the right side thereof is w2, w1 and w2 may be determined by an operation (calculation) described below:

$$w1=(w/(c+d))\cdot(d\cdot a1/(a1+a2)+c\cdot b1/(b1+b2))$$

$$w2=(w/(c+d))\cdot(d\cdot a2/(a1+a2)+c\cdot b2/(b1+b2))$$

§8 Method of preparing decorative paper by embossing processing

While the embodiment of the method of preparing an embossing plate according to this invention was disclosed in the §6, a method of carrying out embossing processing by using the embossing plate prepared in this way to actually prepare a decorative paper will be briefly described below.

Initially, as a material of a decorative paper which becomes a final product, a general base material suitable for embossing processing is prepared. As such a base material suitable for processing, plate, sheet or film comprised of thermoplastic resin is ordinarily widely used. For example, sheets or films comprised of polyolefine resin such as polyethylene, etc., vinyl resin such as polyvinyl chloride, etc., acrylate (acrylic) resin such as poly methyl methacrylate, or the like are generally used. Moreover, there may be used materials in which a pattern such as a grain pattern, etc. is printed on the surface or the back of these sheets or films. In addition, there may be used materials in which two sheets or films or more are stacked.

Embossing processing using an embossing plate prepared in the §6 is carried out with respect to a sheet serving as base material prepared in this way. Namely, heat or pressure is applied to the base material to thereby carry out a processing for forming, onto the base material, uneven structure on the embossing plate. As an apparatus for carrying out such a processing, various devices such as lithographic press, roll embossing press (rotary embossing press), etc. are known. For example, a roll embossing method carried out by a roll embossing press is a method of forming, by heat and pressure, uneven shape of a cylindrical embossing plate surface with respect to material to be processed. Although heating/pressure applying condition with respect to material changes in dependency upon thermal pressing behavior of the material, in the case where most general thermoplastic resin is used as the material, heating is conducted within the range between softening point or thermal deformation temperature and melting point or melting (fusing) temperature so that a suitable temperature is provided to press the embossing plate onto the material to carry out forming thereof to cool it to thereby fix the shape. Thereafter, the embossing plate is separated from the material. As the heating system, various methods such as infrared ray irradiation, hot air spraying, conduction heat from heating roller, induction heating and the like are well known.

Figure 34:
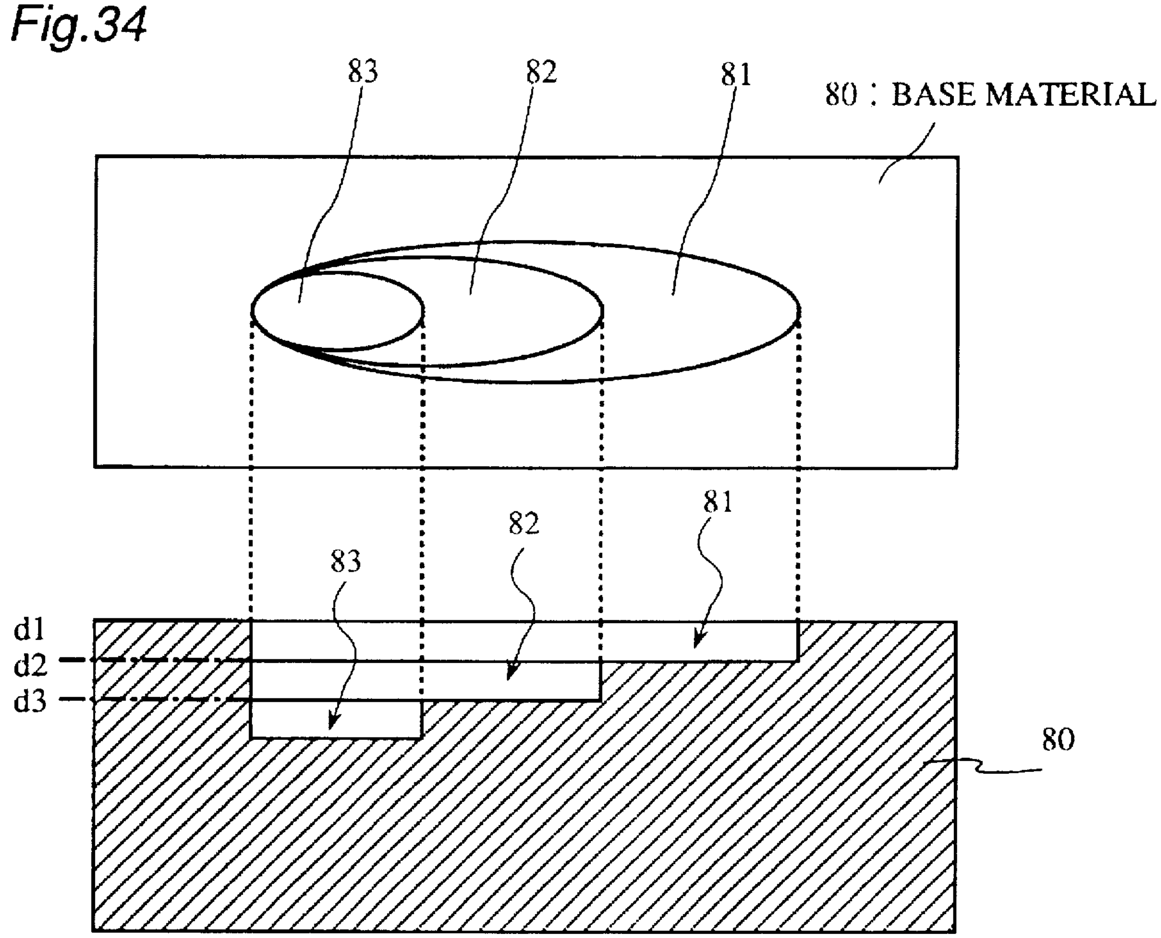
FIG. 34 is a top view and a cross sectional view of a decorative paper prepared by using the embossing plate 43 shown in FIG. 29.

FIG. 34 is a top view and a side cross sectional view showing, in an enlarged manner, a portion of one vessel perforation of a decorative paper prepared by using the embossing plate 43 shown in FIG. 29 prepared by the method described in the §6 to implement embossing processing onto the upper surface of a base material 80. Here, embossing perforations 81, 82, 83 are perforations (grooves) having contours corresponding to the equi-depth lines at depths d1, d2, d3 shown in FIG. 11, and are deeper in order of embossing perforations 81, 82, 83 as apparent from the cross sectional view of the lower part of FIG. 34. It is to be noted that since the offset (step) portions of the embossing plate 43 become somewhat smooth by the property of etching as indicated by broken lines in FIG. 29, offset (step) portions of the embossing perforation formed on the base material 80 become somewhat smooth in practice, and rounded portions are formed at the offset (step) portions (not shown in FIG. 34). The merit of the rounded portion formed at the offset portion will be discussed in the embodiment of §9 which will be described later.

When a vessel perforation is formed on the decorative paper by the offset perforation comprised of a plurality of embossing perforations 81, 82, 83 in this way, depth distribution by offset is formed within the perforation. Accordingly, as compared to the conventional decorative paper in which vessel perforations of uniform depth are formed as shown in FIG. 5, the decorative paper according to this invention provides feeling closer to natural wood in the case where it is observed. Of course, vessel perforation having offset shown in FIG. 34 is a perforation having a very coarse depth distribution as compared to the virtual vessel perforation $G_K$ shown in FIG. 11. However, vessel perforations actually formed on the decorative paper surface have length of about several mm, and when the fact that such vessel perforations are observed by the naked eye is taken into consideration, even if there is employed rough depth distribution of three steps (levels) as shown in FIG. 34, the effect giving feeling close to natural wood is sufficient. It is a matter of course that if there is a desire to form a finer depth distribution, it is sufficient to carry out depth setting of a larger number of steps (levels) at the depth setting means 5 shown in FIG. 10 to prepare a larger number of mask data to carry out patterning process steps of a larger number of stages (steps). However, according as the number of steps (levels) within the vessel perforation is increased to more degree, the number of process steps is increased accordingly and the manufacturing cost becomes higher. Accordingly, when balance between cost and effect is taken into consideration, it is preferable from a viewpoint of practical use to form a vessel perforation having a course depth distribution of two or three steps (levels).

As described above, the feature of the decorative paper shown in FIG. 34 resides in that a vessel perforation is reproduced by an offset groove comprised of three steps (levels). In addition, when embossing grooves 81, 82, 83 constituting the offset groove are observed from the top, they form closed areas which are nested each other. These closed areas all have elongated elliptical shape with respect to common length direction (lateral direction in FIG. 34). Moreover, respective embossing grooves 81, 82, 83 are set so that grooves located more inwardly of the nesting structure are caused to have grater depth. If vessel perforations are constituted by such an offset groove, depth distribution can be formed within the groove. Thus, when such vessel perforations are observed, impression closer to natural wood can be provided.

Moreover, as is clear from FIG. 34, respective elliptical closed areas which take the nesting structure are eccentric with respect to the length direction. Namely, in the example shown, the center position of the inside closed area deviates to the left with respect to the center position of the outside closed area (i.e., in a direction where the vessel perforation is deep). This is because, in the first place, mask data is prepared on supposition of the virtual vessel perforation $G_K$ as shown in FIG. 11. However, such an eccentric offset groove can offer an impression closer to vessel perforation of natural wood to observer.

Figure 35:
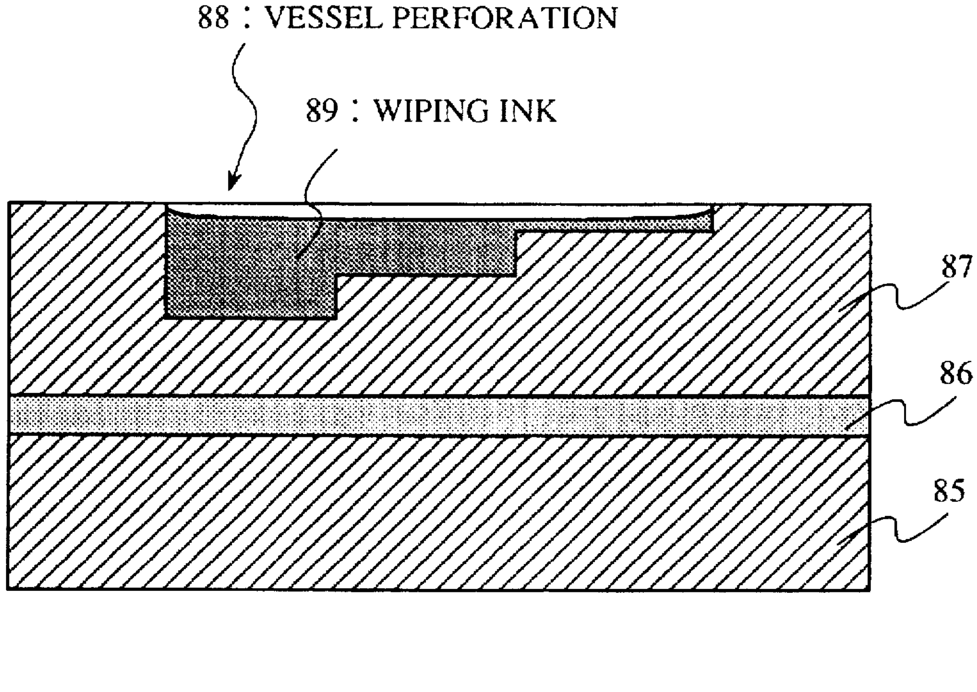
FIG. 35 is a cross sectional view of a decorative paper obtained by implementing embossing processing to a base material having three layer structure to further implement wiping processing thereto.

FIG. 35 is a cross sectional view of a more practical embodiment of a decorative paper prepared by the above-described method. This decorative paper is of a structure such that a pattern of grain is printed by a printing ink layer 86 on an upper surface of a first sheet 85 comprised of thermoplastic resin to further form thereon a second transparent sheet 87 comprised of thermoplastic resin to implement the above-described embossing processing to the upper surface of the second sheet 87 (the printing ink layer 86 and the first sheet 85 somewhat undergo deformation by the embossing processing, but such a deformation is not indicated in the figure). In addition, a wiping ink 89 is filled into a vessel perforation 88 formed by the embossing processing (which is constituted by three steps (levels) of embossing grooves similarly to the example shown in FIG. 34). The technique for filling wiping ink into the groove in this way is conventionally known as wiping processing.

Generally, wiping processing is a painting processing for filling colored ink into a depressed portion of a base material having an uneven structure on a surface thereof to color the depressed portion, and is particularly utilized as a method of representing color within the vessel perforation. Ordinarily, wiping processing is carried out by painting colored ink on the entire surface of a base material having uneven structure thereafter to wipe the surface of the base material by doctor blade, air knife or roller using sponge or cloth, etc. to remove the ink. At this time, as occasion demands (e.g., in the case of representing appearance of painted timber plate, etc.), ink of the projected portion may caused to somewhat remain. For example, in the case where a pattern of grain is printed on the printing ink layer 86 and vessel perforations are formed on the upper surface of the second sheet 87, if black and blown system ink is used as wiping ink to allow a small amount of wiping ink to remain on the projected portion at the time of wiping so that light color is presented, a decorative paper excellent from a viewpoint of design can be prepared.

As wiping ink used for wiping processing, most popular ink for printing may be used. As ink having surface material characteristic (property) particularly suitable for such processing, there is known ink in which pigment such as red iron oxide, chrome yellow or Japanese ink is included in resin as bonding agent such as two liquid hardening type polyurethane using aqueous emulsion such as acryl, etc. or hardener such as isocyanate, etc. At an actual wiping process, it is preferable to mix suitable solvent into such an ink to dilute it so as to have a viscosity such that process such as painting, filling into a depressed portion and/or wiping, etc. can be suitably carried out.

Particularly, when ink having a transparency of a certain degree is used as this wiping ink 89, in the case where vessel perforation 88 is observed from the top, a density distribution corresponding to depth distribution of groove is observed. Namely, according as depth of the groove becomes shallower, wiping ink 89 is observed as a more light color, and according as depth of the groove becomes deeper, wiping ink 89 is observed as a more dark color. Such density distribution presents an impression like more natural wood when observed, and provides effect excellent from a viewpoint of design.

Moreover, in the case where the decorative paper surface is caused to have abrasion resisting property or chemicals resisting property, finishing painting may be further implemented after wiping processing. As such finishing agent, various agents are well known. For example, there may be used finishing agent using, as binder, thermohardening resin such as polyurethane or polyester, etc. of two liquid hardening type using hardener such as isocyanate, etc., or resin such as urethane acrylate, etc. of ultraviolet hardening type or electron beam hardening type. As painting process for finishing agent, methods such as photogravure coat and/or spray coat, etc. are known.

§9 Addition of bank-shaped projected portion into the vessel perforation

Figure 36:
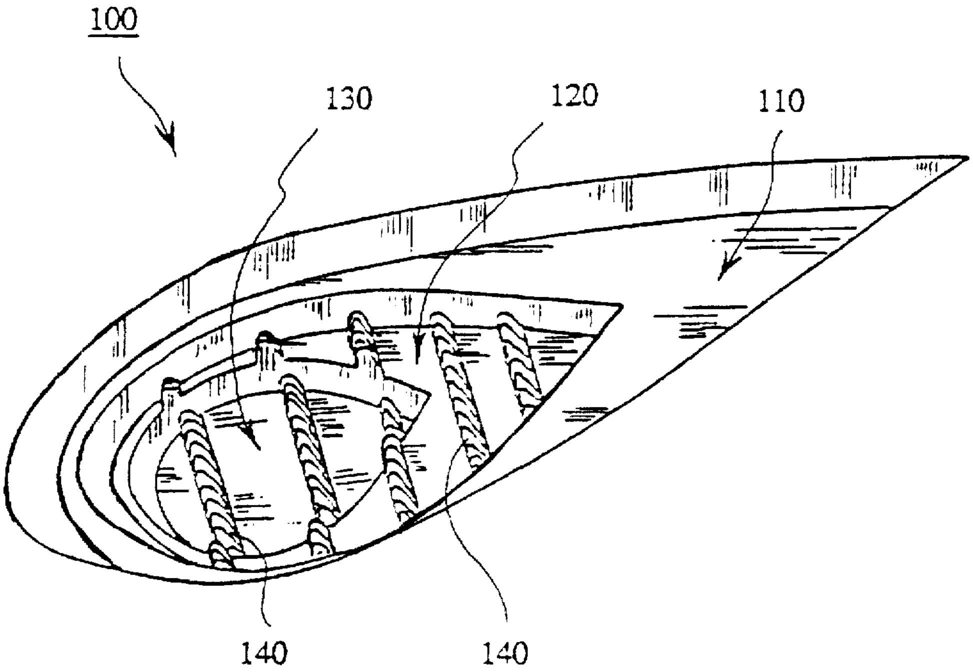
FIG. 36 is a perspective view showing a preferred embodiment of a vessel perforation formed at a decorative paper according to this invention.

A perspective view of a vessel perforation formed on a decorative paper according to a preferred embodiment of this invention is shown in FIG. 36. This vessel perforation is reproduced by an offset groove 100, and the offset groove 100 is composed of three steps (levels) of embossing grooves 110, 120, 130. As previously described, a cross section pattern of a vessel perforation obtained from an actual natural wood does not become ellipse precise from a geometrical point of view, but has slightly distorted shape. Also in the embodiment shown in FIG. 36, contour lines of respective embossing grooves 110, 120, 130 are not elliptical, but have distorted shape. For practical use, artificial deformation processing may be implemented to a virtual vessel perforation determined by calculation within computer thereafter to extract equi-depth lines. For example, a vessel of natural wood is such that a root side is thick and a top side is thin although the degree is very small. To emphasize this property, it is sufficient to carry out such an artificial deformation processing to allow the width of the upper portion of the figure K shown in FIG. 9(*b*) to be thin and to allow the width of the lower portion to be thick. Pattern inherent in natural wood is subjected to deformation by such deformation processing, and is grasped as pattern rather closer to natural wood from a viewpoint of design.

As stated above, the offset groove 100 illustrated in the embodiment shown in FIG. 36 has distorted contour lines which are not ellipse, but has the features common to the embodiment which has been explained in the §8 in that these contour lines are of the structure in which they are nested each other and are closed areas elongated with respect to a common length direction, and in that the center position of the closed area located more inwardly is eccentric to more degree in one direction with respect to the length direction than the central position of the closed areas located more outwardly. As a matter of course, this offset groove 100 has a feature that a closed area located more inwardly has greater depth.

The important feature of the embodiment shown in FIG. 36 resides in that there is further formed convex (projection shaped) bank portions 140 in which the bottom surface of the groove is linearly protruded (raised). In this embodiment, five convex bank portions 140 in total are formed at the bottom surface of the embossing groove 130 of the innermost side and the embossing groove 120 intermediately positioned. These convex bank portions 140 are formed in a manner to traverse the bottom surface of the groove in a direction substantially perpendicular to the length direction of the offset groove 100. While a length in the length direction of the offset groove 100 is the order of several mm, a width of the convex bank portion 140 is about 10 μm. In addition, while a height of the convex bank portion 140 is about ⅓ to ½ of a depth of each groove in this embodiment, this invention is not limited by such dimensional ratio by any means.

When such convex bank portions 140 are formed, the effect in design of the offset grooves 100 formed on the surface of the decorative paper is improved, and an impression closer to vessel perforation of natural wood can be offered to observer. Within vessel perforations of actual natural wood, fiber shaped streaks (stripes) which should be so called "node" exist. The convex bank portions 140 formed in this embodiment represent, in a pseudo-manner, fiber shaped streaks which should be so called "node" of natural wood.

Figure 37:
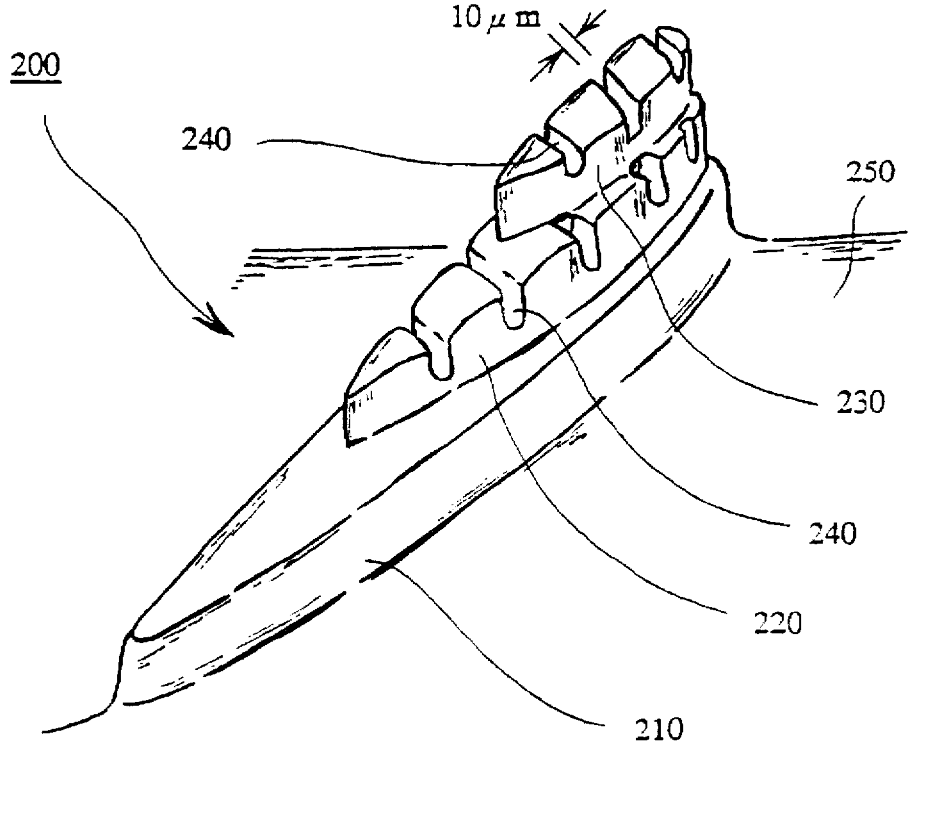
FIG. 37 is a perspective view showing a preferred embodiment of an offset protruded body formed on an embossing plate according to this invention.

FIG. 37 is a perspective view showing an example of the configuration of an embossing plate for obtaining the offset groove having convex bank portions as shown in FIG. 36 by embossing processing. In this example, an offset protruded (raised) body 200 is formed on a plate material 250. By forming three-dimensional shape of the offset protruded body 200 on the plate material 250, it is possible to form the offset groove 100 having convex bank portions as shown in FIG. 36. The offset protruded body 200 is a structure consisting of protruded bodies 210, 220, 230 stacked in order. Contour lines when protruded bodies 210, 220, 230 are viewed from the top respectively constitute closed areas elongated with respect to the common length direction, and of a structure nested to each other. Moreover, center positions of the closed areas located more inwardly are eccentric to more degree in one direction with respect to the length direction than center positions of the closed areas located more outwardly. In addition, there is employed a configuration in which the protruded bodies located more inwardly of the nesting structure have greater height. Of course, such features that the offset protruded body 200 has have the relationship exactly opposite to the features that the offset groove 100 shown in FIG. 36 has.

Another feature of the offset protruded body 200 resides in that concave (depression shaped) recessed portions 240 consisting of a linear groove are formed on the upper surfaces of the protruded bodies 220, 230. This concave recessed portion 240 has a width of about 10 μm, and of course serves to form convex bank portions 140 in the offset groove 100.

Figure 38:
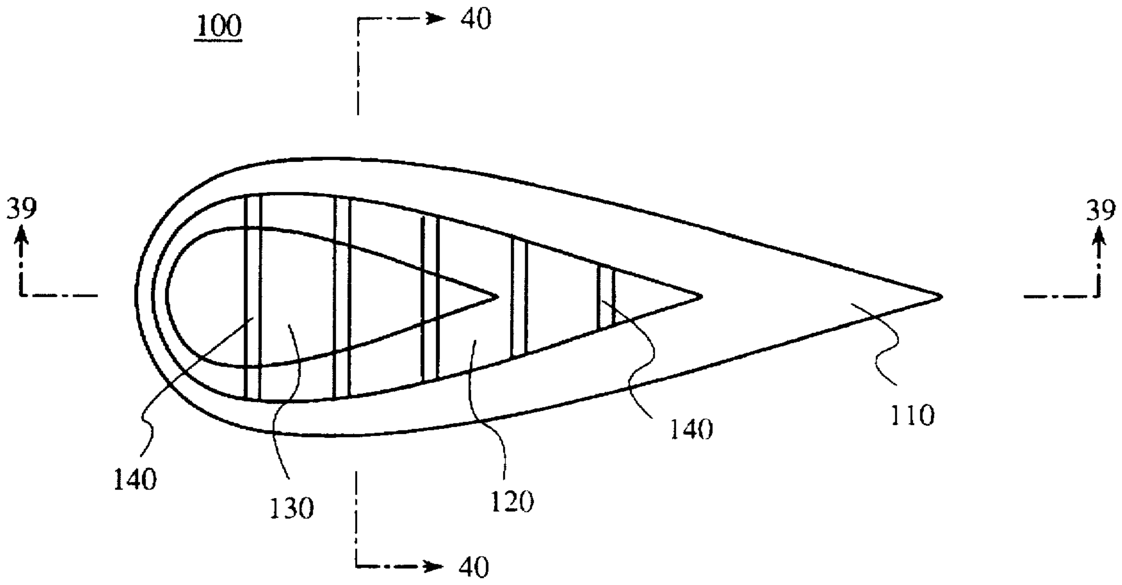
FIG. 38 is a plan view of the vessel perforation shown in FIG. 36.
Figure 39:
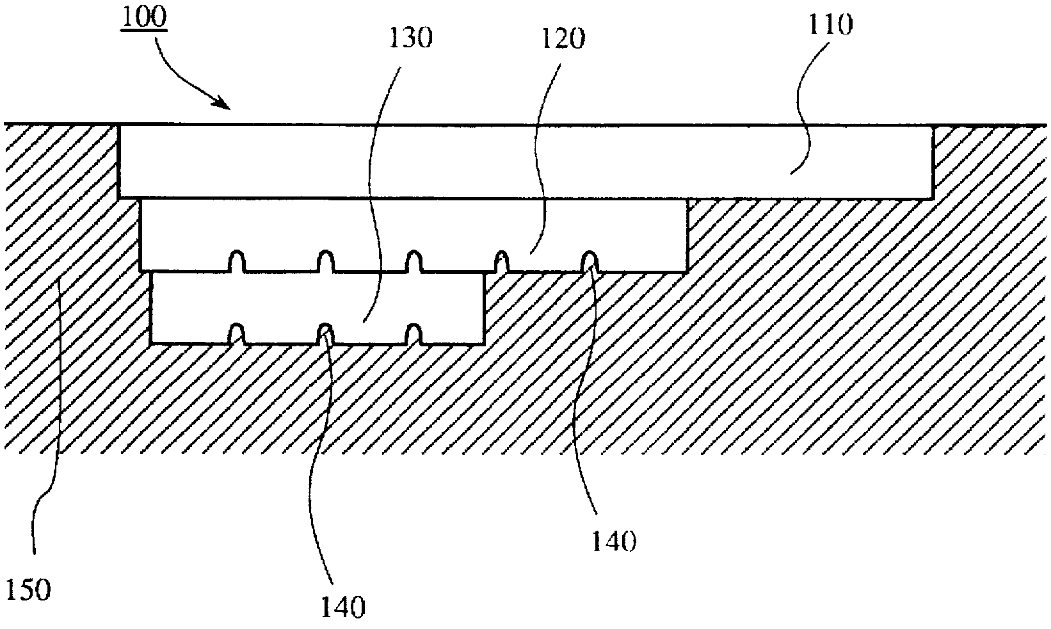
FIG. 39 is a cross sectional view showing a cross section cut along a cutting line 39—39 of the vessel perforation shown in the plan view of FIG. 38.
Figure 40:
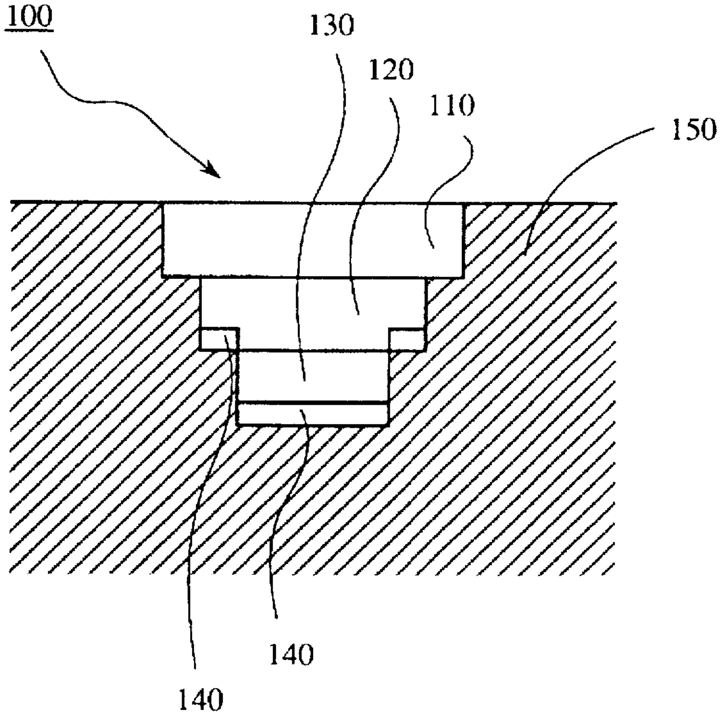
FIG. 40 is a cross sectional view showing a cross section cut along a cutting line 40—40 of the vessel perforation shown in the plane view of FIG. 38.
Figure 41:
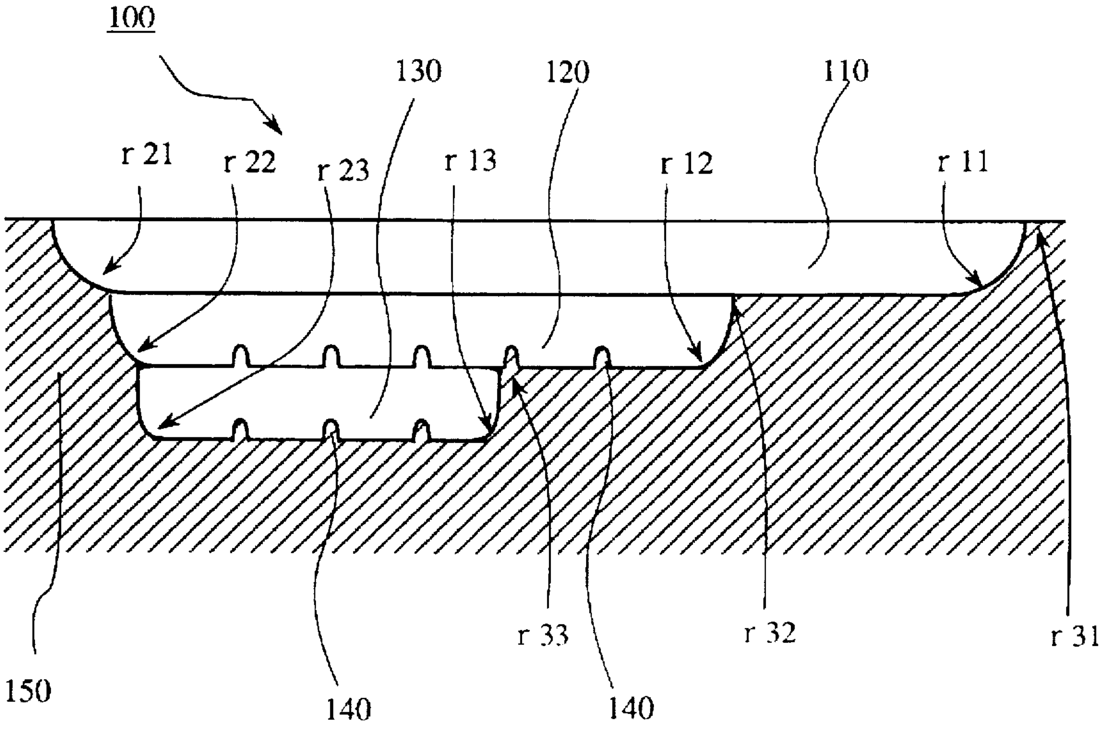
FIG. 41 is a cross sectional view showing an embodiment in which intersecting portions of bottom surfaces and side surfaces of the vessel perforation shown in the cross section of FIG. 39 are caused to have rounded portions.

FIG. 38 is a plan view of the offset groove 100 (vessel perforation) shown in FIG. 36. Moreover, FIGS. 39 and 40 are cross sectional views showing respective cross sections cut along cutting lines 39—39 and cutting lines 40—40 when the above-mentioned vessel perforation is formed in a base material 150. By these figures, structures of respective portions will be more clarified. On the other hand, FIG. 41 depicts the cross section of the vessel perforation shown in FIG. 39 in a manner such that the offset portion is caused to have rounded portion. As previously described in the §6, the embossing plate according to this invention is prepared by repeatedly carrying out etching process with respect to the plate material. After undergone such an etching process, the offset portion becomes smooth shape having slightly rounded portion as indicated by broken lines in FIG. 29. In FIG. 41, r11 to r13, r21 to r23 are radius of curvature of rounded portions which are formed at intersecting portions of bottom surfaces and side surfaces of respective portions of the vessel perforation 100. It should be noted that, with respect to these radii of curvature, the relationship expressed as r11>r12>r13 and r21>r22>r23 is obtained. In other words, rounded portions with respect to deeper portions have smaller radii of curvature. The reason why such relationship is obtained will be easily understood when consideration is made in connection with the etching process described in the §6. Namely, at the process for preparing the embossing plate, respective protruded bodies corresponding to embossing grooves 110, 120, 130 will be formed in order from the outside. For this reason, the portions indicated by radii of curvature r11, r21 undergo three times of etching operations in total, the portions indicated by radii of curvature r12, r22 undergo two times of etching operations in total, and the portions indicated by radii of curvature r13, r23 undergo one etching operation in total. Accordingly, the portion which undergo larger number of etching operations have greater radii of curvature.

If an embossing plate is prepared in this way via the etching process described in the §6 to form the offset groove 100 by using the embossing plate, radii of curvature of respective portions necessarily have a relationship as described above. Meanwhile, such relationship of radius of curvature gives benefit for allowing the structure of the offset groove 100 to be closer to vessel perforations of natural wood. Namely, also in actual vessel perforations of natural wood, corner portions of shallow portions indicated by radii of curvature r11, r21 in FIG. 41 are gently smooth as an entrance portion where vessels are admitted into the timber. In contrast, corner portions of deep portions indicated by radii of curvature r13, r23 in FIG. 41 are sharp to some extent by fine uneven fiber structure of the groove bottom portion. Accordingly, the relationship of radii of curvature of respective portions obtained by the etching process described in the §6 becomes in correspondence with the relationship of radii of curvature of respective portions of vessel perforations of natural wood. Further, the structure in which a sharp curvature is provided on the vessel perforation bottom portion provides the effect that the depth of the vessel perforation portion is visually emphasized.

It is to be noted that while portions indicated by radii of radius r31 to r33 in FIG. 41 are also rounded to some extent by etching, the structures of these portions hardly affect appearance. Employment of the structure rounded to some extent rather results in no possibility that feeling of incompatibility is given as a vessel perforation.

Figure 42:
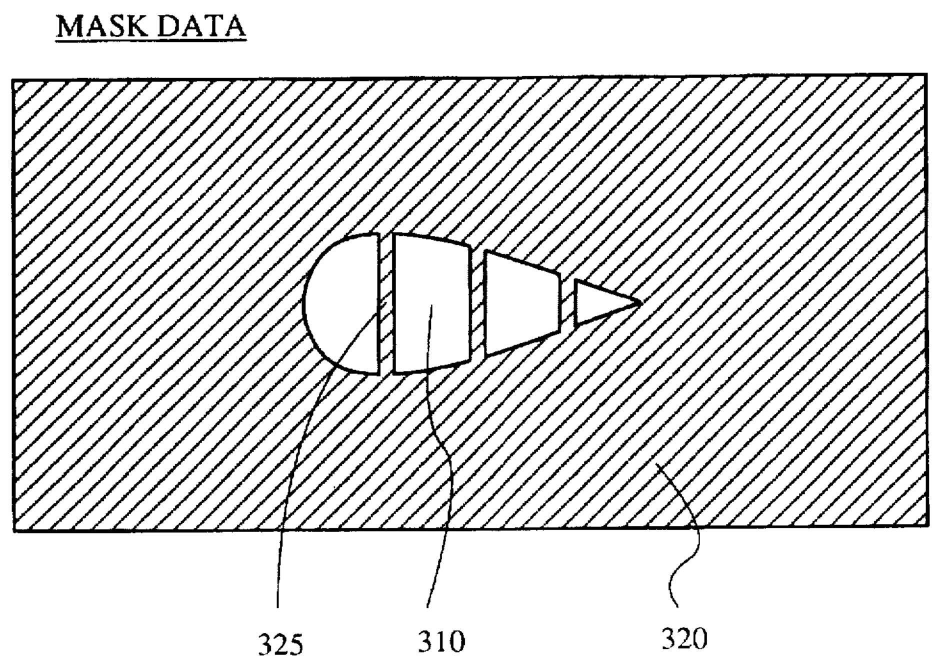
FIG. 42 is a plan view showing an example of mask data used for preparing the embossing plate shown in FIG. 37.

Subsequently, a method for adding convex bank portions 140 within the offset groove 100 will be briefly described. In order to form the convex bank portions 140, it is necessary to form concave recessed portions 240 on the embossing plate. For the purpose of forming such concave recessed portions 240, it is sufficient to add such information at the stage of mask data. For example, if mask data as shown in FIG. 42 is prepared, it is possible to form concave recessed portions 240 at etching process for plate material. The mask data shown in FIG. 42 is constituted by an area 310 having a first pixel value and an area 320 having a second pixel value. In this example, the area 320 includes linear areas 325.

It is to be noted that height of convex bank portions 140 formed within the offset groove 100 of decorative paper, i.e., depth of the concave recessed portions 240 formed on the offset protruded body 200 on the embossing plate can be controlled to some extent by width of linear areas 325 in this mask data and etching condition at the time of preparing the embossing plate. In actual terms, it is possible to freely adjust height of the convex bank portions 140. The height may be set to the same height of a step of each groove or may be set to a height which is about one third thereof or less. For example, in the case where etching with respect to the plate material is carried out on the basis of mask data shown in FIG. 42, etching solution (etchant) is exerted on area 320 (area including linear areas 325) having second pixel value, which is indicated by implementing hatching in the figure. In view of the above, if setting is made such that a width of linear areas 325 is narrow to some extent and circulation of etching solution at the time of etching is caused to be lesser (the solution is kept in more stationary state), fresh etching solution is difficult to be delivered into the linear areas 325, resulting retarded development of etching. For this reason, recessing quantity of the concave recessed portions 240 formed on the embossing plate becomes small, and a height of convex bank portions 140 formed within the offset groove 100 of the decorative paper necessarily becomes lower. In contrast, if setting is made such that a width of the linear areas 325 is broad to some extent and circulation of etching solution at the time of etching is promoted to more degree (solution is agitated well), fresh etching solution is apt to be delivered into the linear areas 325, resulting in advanced development of etching. For this reason, recessing quantity of the concave recessed portions 240 formed on the embossing plate becomes great, and a height of the convex bank portions 140 formed within the offset groove 100 of the decorative paper also necessarily becomes higher (which becomes the same height as a step difference of each groove at the maximum, and the upper end portion of the convex bank portion 140 is the same as the level of the bottom surface of the groove of the upper step (level).

Figure 43:
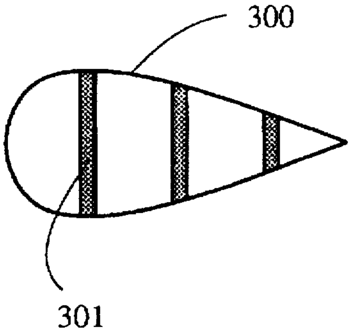
FIGS. 43(*a*) to (*d*) are views showing variation of linear areas formed within the internal area in the mask data shown in FIG. 42.
Figure 43:
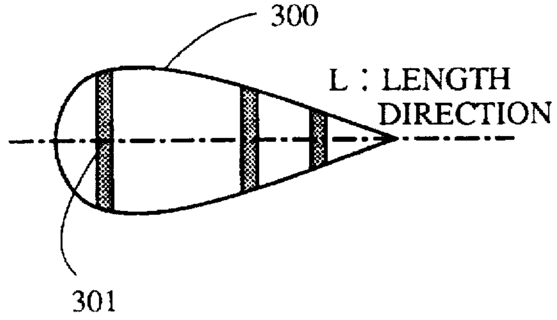
Figure 43:
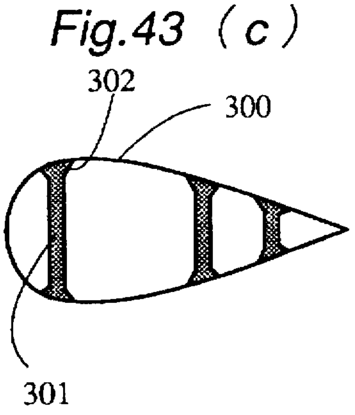
Figure 43:
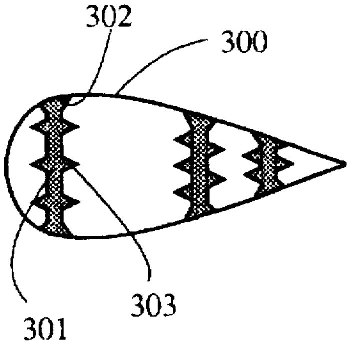

FIGS. 43(*a*) to (*d*) show variations of the linear area. FIG. 43(*a*) corresponds to mask data shown in FIG. 42. In order to prepare mask data shown in FIG. 42, there is first prepared picture data in which an internal area 300 encompassed by an equi-depth line is indicated by first pixel value and an outside area existing outside the internal area is indicated by second pixel value. Then, it is sufficient to define a base (basic) line 301 within the internal area 300 to use this base line 301 as a linear area as it is to carry out a processing for replacing the internal portion by the second pixel value. In this example, with respect to the inside portion of the internal area 300, the area having first pixel value is indicated by white and the area having second pixel value is indicated by black.

FIG. 43(*b*) is an example in which the linear area is defined by a more preferable method. Namely, in this example, base lines 301 are defined at random positions along the length direction L. While equidistant linear areas are defined in the example shown in FIG. 43(*a*), it is preferable from the viewpoint where such areas are nodal areas produced within a vessel perforation of natural wood to define linear areas at random positions as shown in FIG. 43(*b*). In more practical sense, it is sufficient to set mean spacing (interval) and dispersion value of linear areas to be defined and successively define respective base lines 301 at random positions while generating random numbers by computer. It is to be noted that, with respect to width of the base line 301, a predetermined width may be determined in advance, or width may be determined by random numbers.

FIG. 43(*c*) is an example where extended width portions 302 are added to both end portions of the base line 301. Linear areas of which widths are expanded at the boundary portion look natural. Moreover, FIG. 43(*d*) is an example where lines are obtained by further adding width changed portions 303 to the base line 301. Line width of linear area which is caused to be changed in this way look more natural rather than the fixed line width.

Figure 44:
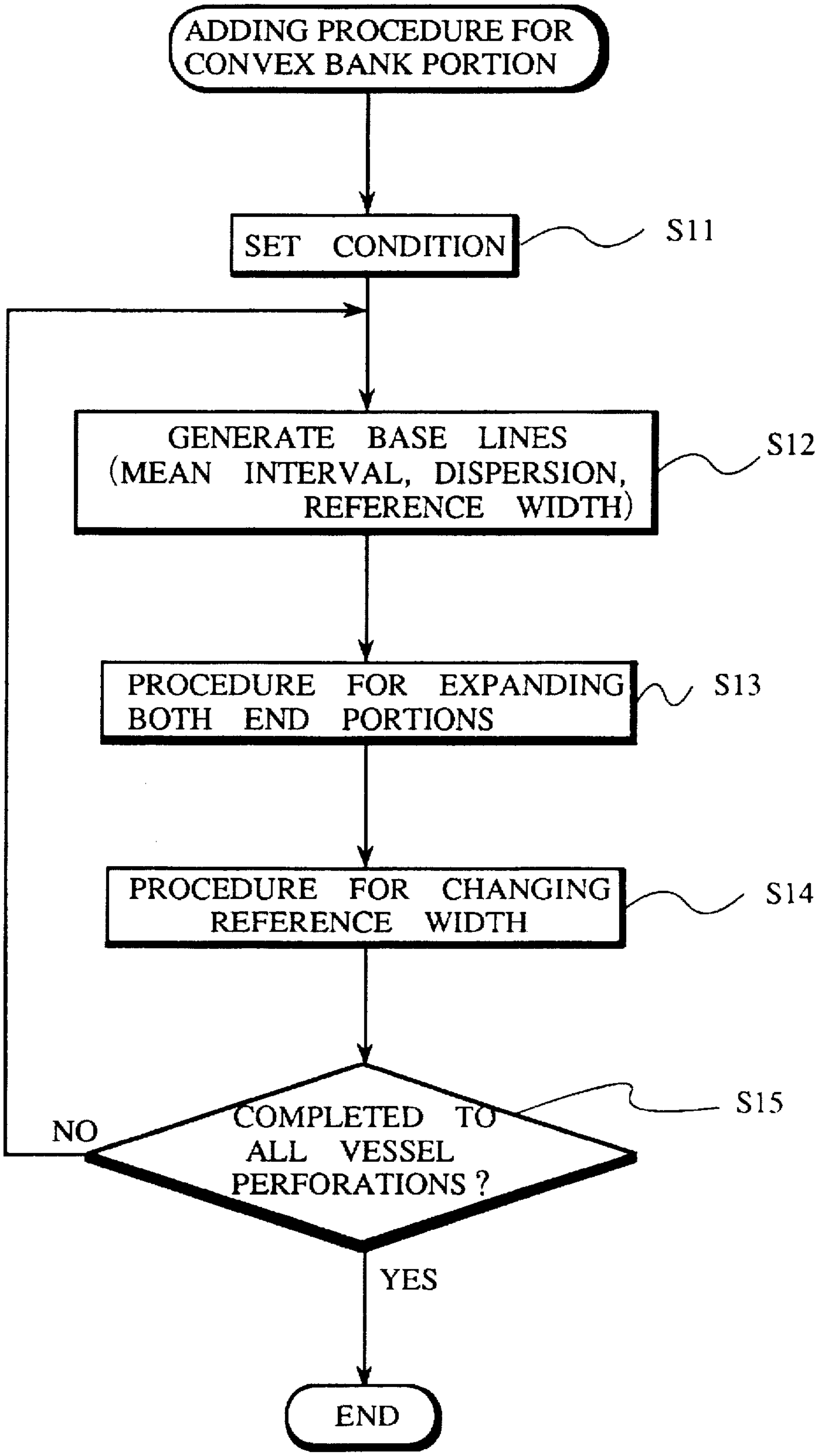
FIG. 44 is a flowchart showing processing procedure for adding bank-shaped projected portion within an offset groove formed on a surface of a decorative paper.

FIG. 44 is a flowchart showing more practical processing procedure for adding information of the convex bank portion to mask data. Initially, at step S11, setting of the condition relating to convex bank portion to be added is carried out. Then, at step S12, base lines 301 are generated. Namely, mean interval and dispersion value set at the step S11 are used to generate base lines 301 having a predetermined reference width at random positions while generating random numbers by computer, and picture data as shown in FIG. 43(*b*) is obtained. At the subsequent step S13, both end portion width expanding processing of respective base lines 301 are carried out. Namely, as shown in FIG. 43(*c*), expanded width portions 302 are added to both end portions of respective base lines 301 to expand their widths. While circular arc area or triangular area may be defined as expanded width portion 302, width expanding quantity may be determined in advance in dependency upon distance from the end. Further, at step S14, as shown in FIG. 43(*d*), width changed portions are added to base lines 301. Until such processing is completed with respect to all vessel perforations, processing operation returns from step S15 to step S12. Namely, since shapes with respect to a large number of vessel perforations are incorporated or included within one mask data, the same processing is repeated with respect to all vessel perforations. If processing are respectively individually carried out with respect to respective vessel perforations in this way, unique linear areas can be added to respective vessel perforations.

Figure 45:
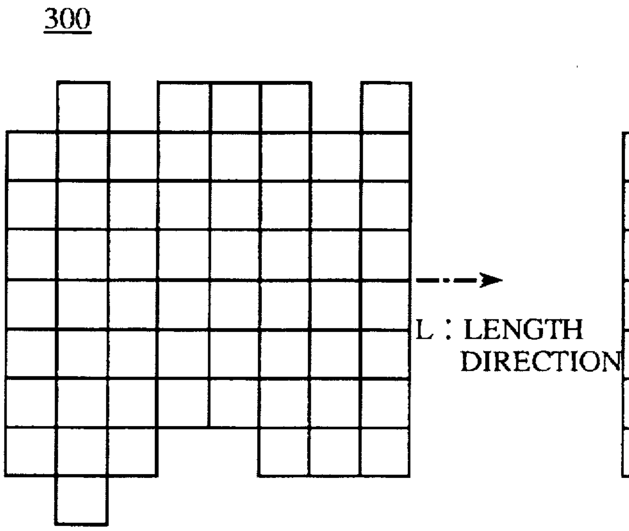
FIGS. 45(*a*) to (*d*) are views showing more practical image processing based on the processing procedure shown in FIG. 44.
Figure 45:
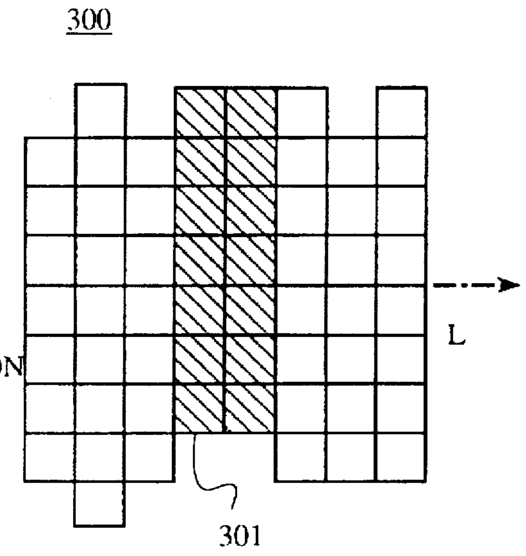
Figure 45:
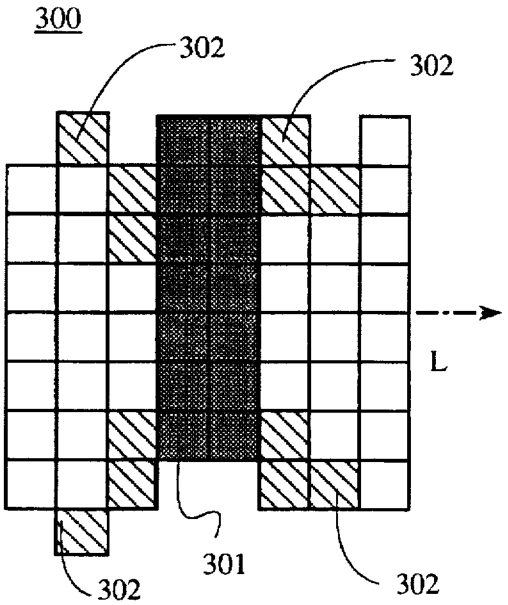
Figure 45:
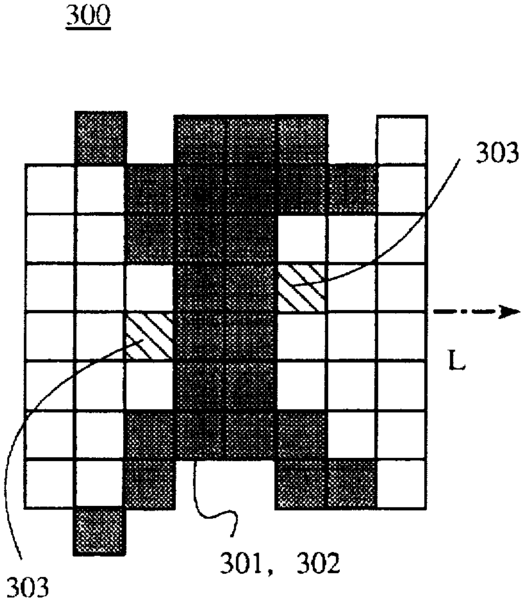

FIGS. 45(*a*) to (*d*) show processing based on the procedure shown in FIG. 44 in connection with actual picture. For example, it is assumed that lateral direction of the figure is caused to be a length direction L of vessel perforation and an internal area 300 is formed by pixel arrangement as shown in FIG. 45(*a*). When base line generating processing of step S12 is carried out with respect to such internal area 300, a base line 301 (indicated by pixels of slanting line hatching) as shown in FIG. 45(*b*) is defined. In this example, reference width of the base line 301 is defined as two pixels. Subsequently, both end portion width expanding processing of step S13 is carried out, and newly defined width expanded portions 302 (indicated by pixels of slanting line hatching) are added to the base line 301 (indicated by pixels painted black). In this embodiment, in left and right pixel trains in contact with the base line 301, two pixels from respective ends are defined at a time as pixels constituting the expanded width portion 302. Moreover, in pixel trains adjacent in further left and right directions, one pixel from respective ends is defined at a time as pixel constituting the expanded width portion 302. Finally, at step S14, changing processing to the reference width is carried out, and newly defined width expanded portions 303 (each indicated by pixel of slanting line hatching) are added to the base line 301 and the expanded width portion 302 (indicated by pixel painted black). In this embodiment, random numbers are used to define several pixels in contact with the base line 301 as pixels constituting the width changed portion 303. Thus an area consisting of base line 301, expanded width portion 302 and width changed portion 303 is finally obtained.

Figure 46:
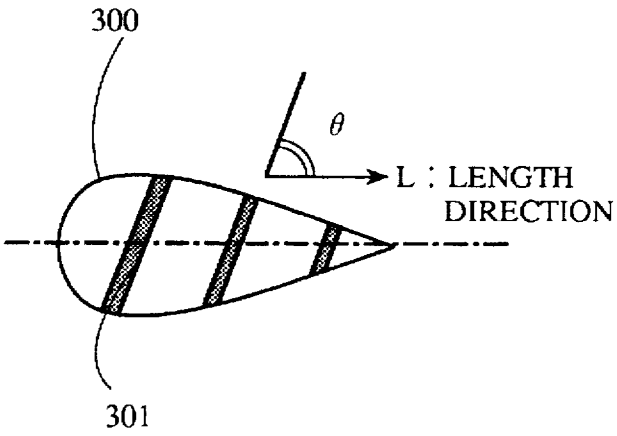
FIGS. 46(*a*) to (*c*) are views showing further different variation of linear areas formed within the internal area in the mask data shown in FIG. 42.
Figure 46:
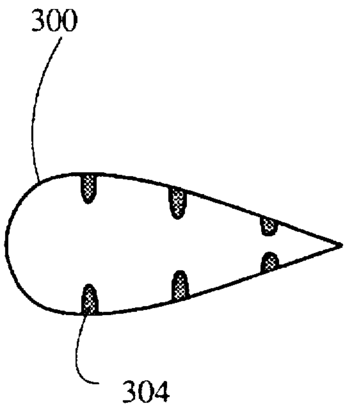
Figure 46:
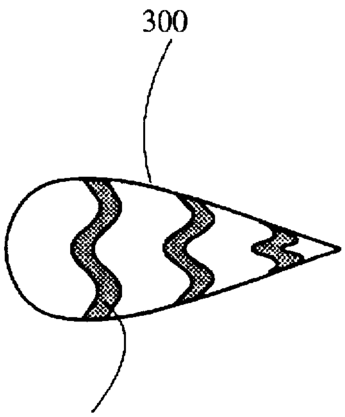

Finally, there is disclosed a further variation of linear areas is shown in FIGS. 46. While the base line 301 is defined as a line directed to a direction perpendicular to the length direction L in the above-described embodiments, it is not necessarily required to allow the base line 301 to be perpendicular to the length direction L. FIG. 46(*a*) shows the example where base line 301 is defined with an arbitrary angle θ with respect to the length direction L. Moreover, while base line 301 is defined as a straight line extending in a manner to traverse the internal area 300 in the above-described embodiments, it is not necessarily required that the base line 301 completely traverses the internal area 300 therewithin, the base line 301 may be an intermittent line 304 disposed at a portion as shown in FIG. 46(*b*), for example. In addition, the base line 301 may be a curve 305 as shown in FIG. 46(*c*).

INDUSTRIAL APPLICABILITY

This invention can be widely utilized as surface decorative papers having grain pattern, e.g., building material such as wall paper, ceiling material, floor material, etc., or furniture or cabinet of electric appliances, etc., and can be widely utilized in a process for preparing an embossing plate required for mass-producing such decorative papers.

What is claimed is:

1. A decorative paper comprising a base material having a top surface, said base material having formed therein an offset groove such that the base material comprises a plurality of side and bottom surfaces, a first of the side surfaces defining with at least first and second of the bottom surfaces a first enclosed elongate area, a second of the side surfaces defining with at least the second bottom surface a second enclosed elongate area that is smaller than and contained within the first enclosed elongate area, said first bottom surface being recessed below the top surface with the first side surface disposed therebetween, said second bottom surface being recessed below the first bottom surface with the second side surface disposed therebetween, said first and second elongate areas extending longitudinally in a common direction.

2. A decorative paper as claimed in claim 1, wherein the first enclosed elongate area extends longitudinally between a first portion of the first side surface and a second portion of the first side surface, the second elongate area having a center that is disposed closer to an area directly below the first portion of the first side surface than to an area directly below the second portion of the first surface.

3. A decorative paper as claimed in claim 2, wherein the second elongate area extends longitudinally between a first portion of the second side surface and a second portion of the second side surface, the first portion of the second side surface being contiguous to the area directly below the first portion of the first side surface.

4. A decorative paper as claimed in claim 1, wherein the bottom surfaces and side surfaces form intersecting edges with rounded portions, an intersecting edge formed by the second side surface and the second bottom surface having a rounded portion with a smaller radius of curvature than a rounded portion of an intersecting edge formed by the first side surface and the first bottom surface.

5. A decorative paper as claimed in claim 1, wherein the first bottom surface, the second bottom surface or both contain linear protrusions which form convex bank portions.

6. A decorative paper as claimed in claim 1, further comprising wiping ink filling the offset groove, said wiping ink having a transparency that renders visible a depth distribution of the offset groove.

7. A decorative paper as claimed in claim 1, wherein the base material comprises a sheet layer of thermoplastic resin, said paper further comprising a print ink layer having a grain pattern.

8. A decorative paper as claimed in claim 1, wherein each of the first and second elongate areas is generally elliptical in shape.

9. A decorative paper as claimed in claim 1, wherein each of the first and second elongate areas is of teardrop shape.

10. A decorative paper as claimed in claim 1, wherein the base material has a plurality of the offset grooves formed periodically therein.

11. A decorative paper as claimed in claim 1, wherein the base material further comprises a third side surface and a third bottom surface, said third side surface defining with at least said third bottom surface a third enclosed elongate area that is smaller than and contained within the second elongate area, said third bottom surface being recessed below the second bottom surface with the third side surface disposed therebetween, the third elongate area extending longitudinally in the common direction.

12. A decorative paper as claimed in claim 11, wherein each of the first, second and third elongate areas extends longitudinally between respective first and second portions of the first, second and third side surfaces, the first portion of the second side surface being contiguous to an area directly below the first portion of the first side surface, the first portion of the third side surface being contiguous to an area directly below the first portion of the second side surface.

* * * * *